(12) United States Patent
Herman et al.

(10) Patent No.: US 10,864,540 B2
(45) Date of Patent: Dec. 15, 2020

(54) MATERIAL DISPENSER CONTROL ASSEMBLY

(71) Applicant: MERITOOL LLC, Salamanca, NY (US)

(72) Inventors: Timm Randal Herman, Ellicottville, NY (US); Brent Michael Findlay, East Concord, NY (US); Mason S. James, Cuba, NY (US)

(*) Notice: Subject to any disclaimer, the term of this patent is extended or adjusted under 35 U.S.C. 154(b) by 0 days.

(21) Appl. No.: 15/945,379

(22) Filed: Apr. 4, 2018

(65) Prior Publication Data

US 2018/0312324 A1 Nov. 1, 2018

Related U.S. Application Data

(60) Provisional application No. 62/482,025, filed on Apr. 5, 2017, provisional application No. 62/481,967, filed on Apr. 5, 2017, provisional application No. 62/482,002, filed on Apr. 5, 2017.

(51) Int. Cl.
| | |
|---|---|
| *B05B 12/00* | (2018.01) |
| *B05B 12/02* | (2006.01) |
| *H02P 3/06* | (2006.01) |
| *B05C 17/01* | (2006.01) |
| *B05C 11/10* | (2006.01) |
| *B05C 17/005* | (2006.01) |

(52) U.S. Cl.
CPC .......... *B05B 12/002* (2013.01); *B05B 12/004* (2013.01); *B05B 12/02* (2013.01); *B05C 11/1002* (2013.01); *B05C 17/0103* (2013.01); *B05C 17/014* (2013.01); *B05C 17/0116* (2013.01); *H02P 3/06* (2013.01); *B05C 17/00553* (2013.01)

(58) Field of Classification Search
CPC ..... B05B 12/002; B05B 12/02; B05B 12/004; H02P 3/06
See application file for complete search history.

(56) References Cited

U.S. PATENT DOCUMENTS

| | | | | |
|---|---|---|---|---|
| 2,732,102 | A | * | 1/1956 | Ekins ................... B05C 17/0126 222/327 |
| 2,933,597 | A | * | 4/1960 | Jensen ..................... H01Q 1/08 343/880 |
| 3,003,047 | A | * | 10/1961 | Daniels .................. H01H 13/28 200/436 |
| 3,208,638 | A | * | 9/1965 | Frenzel ............... B05C 17/0103 222/39 |
| 3,294,942 | A | * | 12/1966 | Mason ................. H01H 15/102 200/508 |

(Continued)

*Primary Examiner* — Patrick M. Buechner
(74) *Attorney, Agent, or Firm* — Tarolli, Sundheim, Covell & Tummino LLP; John A. Yirga, Esq.

(57) ABSTRACT

A control assembly for a material dispenser includes a plunger movably located within a bore of the assembly, the plunger having first and second ends, the first end having an abutment for moveably retaining the plunger within the bore and the second end for engaging a switch during operation of the material dispenser to cease operation. A biasing member located within the bore, the biasing member engaging the first end of the plunger, the biasing member allowing for the manual movement of the plunger without harm to the switch of the material dispenser during use.

20 Claims, 33 Drawing Sheets

(56) References Cited

U.S. PATENT DOCUMENTS

| | | | |
|---|---|---|---|
| RE26,180 E * | 4/1967 | Frenzel et al. | B05C 17/01 222/39 |
| 3,410,973 A * | 11/1968 | Fraser | H01H 13/285 200/435 |
| 3,563,650 A * | 2/1971 | Okuno | G03B 15/05 355/71 |
| 4,169,254 A * | 9/1979 | Kennedy | H01H 89/04 200/61.08 |
| 4,171,072 A * | 10/1979 | Davis, Jr. | B05C 17/0103 222/326 |
| 5,341,958 A * | 8/1994 | Bayat | B05C 17/0103 222/333 |
| 5,390,831 A * | 2/1995 | Schneider | B05C 17/01 222/137 |
| 6,889,872 B2 | 5/2005 | Herman et al. | |
| 8,020,727 B2 | 9/2011 | Herman et al. | |
| 8,393,501 B2 | 3/2013 | Herman et al. | |
| 8,950,627 B2 | 2/2015 | Herman et al. | |
| 2004/0045982 A1 * | 3/2004 | Herman | B05C 17/00553 222/145.5 |
| 2006/0043120 A1 * | 3/2006 | Campbell | B05C 17/0146 222/386.5 |
| 2007/0102457 A1 * | 5/2007 | Campbell | B05C 17/0103 222/333 |
| 2010/0001017 A1 * | 1/2010 | Herman | B05C 17/0103 222/1 |
| 2013/0270302 A1 * | 10/2013 | Hsu | B05B 12/002 222/333 |
| 2016/0051998 A1 * | 2/2016 | Goisot | B05B 1/3046 239/706 |

* cited by examiner

MATERIAL DISPENSER CONTROL ASSEMBLY

CROSS-REFERENCE TO RELATED APPLICATIONS

The present application claims priority under 35 U.S.C. § 119(e) to U.S. Provisional Patent Application Ser. No. 62/481,967 filed Apr. 5, 2017 entitled MATERIAL DISPENSER STABILIZING ASSEMBLY, to U.S. Provisional Patent Application Ser. No. 62/482,025 filed Apr. 5, 2017 entitled MATERIAL DISPENSER CONTROL ASSEMBLY, and to U.S. Provisional Patent Application Ser. No. 62/482,002 filed Apr. 5, 2017 entitled TRIGGER ASSEMBLY AND METHOD OF OPERATION. The entire contents of the above-identified applications from which priority is claimed are incorporated herein by reference in their entireties for all purposes.

FIELD OF THIS DISCLOSURE

The present disclosure relates to a material dispenser controller assembly. More specifically, the present disclosure relates to a material dispenser controller assembly that limits the travel of a rack and a piston moving in a barrel or tube of a material dispensing tool.

BACKGROUND

Dispensing tools have been available for a number of years, assisting in the application of material to a desired surface in residential, commercial, or manufacturing environments. Such materials include, for example, adhesives, lubricants, and sealants such as, silicone, urethanes, and caulk. Conventional dispensing tools frequently visualized are of the type of a handheld caulk gun, as illustrated in U.S. Pat. No. 8,950,627 that issued on Feb. 10, 2015 and is assigned to the assignee of the present disclosure (hereinafter "the '627 Patent"). The '627 Patent is incorporated herein by reference in its entirety for all purposes.

Cartridges having any number of different types of materials, including those listed above are inserted into a cartridge support sleeve located on the top side of the dispensing tool or handheld caulk gun. A manual trigger on the gun when actuated drives a rack having a plunger or piston that engages the material located in the cartridge such that each actuation of the trigger, forces material to be dispensed from a nozzle located at an end of the cartridge.

A more modern dispensing tool for applying various materials, including those materials listed above is a power dispensing gun as also described in detail and illustrated in the '627 Patent. The power dispensing gun includes a battery, pneumatic, or other means for powering motor for portable use. The power dispensing gun is also capable of using the cartridges filled with dispensing material by inserting the cartridges into a support sleeve located on the top of the power dispensing gun. A trigger on the power dispensing gun is actuated, driving a rack having a plunger or piston that engages the material located in the cartridge such that each actuation of the trigger forces material to be dispensed from a nozzle located at the end of the gun.

Further details of the operation and configuration of a power dispensing gun are also explained for example, in U.S. Pat. No. 6,889,872 entitled ELECTRIC TWO PART MATERIAL DISPENSER that issued on May 10, 2005, U.S. Pat. No. 8,020,727 entitled POWER DISPENSING TOOL AND METHOD FOR CONTROLLING SAME that issued on Sep. 20, 2011, and International Patent Application Serial No. PCT/US2017/22634 entitled BATTERY POWERED DISPENSER FOR ONE AND TWO COMPONENT FOILS AND CARTRIDGES that was filed on Mar. 16, 2017. The above-identified patents and application are assigned to the assignee of the present application and incorporated herein by reference in their entireties for all purposes.

Cartridges are not the only form of container for holding material used by the dispensing guns, but another known type of container is a sausage pack or bag-type containers are also used. The sausage pack has a first and a second end spaced about a body having dispensing material therein. The sausage pack during use is positioned in a housing tube or barrel located on the guns in place of the cartridge support sleeves. The sausage pack once inserted into the guns has an opening typically formed from removal of a containment ring or by piercing the sausage pack toward the nozzle and the plunger squeezes the material out the nozzle when the trigger is engaged.

One example of a dispensing tool having interchanging support sleeves includes U.S. Pat. No. 8,393,501 entitled DISPENSING TOOL that issued on Mar. 12, 2013, is assigned to the assignee of the present disclosure, and is incorporated herein by reference in its entirety for all purposes. The '501 Patent illustrates a system for interchanging support sleeves from a cartridge-type dispenser to a sausage pack dispenser and vice versa as desired by the operator on a single power dispenser.

Sausage packs are typically more economical because of their cheaper fabrication. As a result, the sausage packs are typically used more frequently in high volume commercial and manufacturing operations over conventional cartridges in material dispensing guns.

Illustrated in FIGS. 1A-1E is a power dispensing tool for use with a sausage holder/pack. FIG. 1A illustrates a piston pushing against the pack within the barrel of the tool, FIG. 1B illustrates assignee's patented piston as further described in U.S. Pat. No. 8,950,627, which is incorporated herein in its entirety for all purposes. FIG. 1C illustrates an exploded view of a conventional barrel assembly. FIG. 1D illustrates a sausage pack/holder and barrel. While FIG. 1E illustrates the piston being retracted from the sausage pack and the resultant pack shape that is typically lodged at the distal end of the barrel when the process is complete. This typically results in an undesirable situation that the user of the tool has to remove the spent sausage sleeve with his or her hand, or simple hand tools such a pliers. The silicone, caulk or other material is typically very viscous or sticky and unpleasurable or even unsafe to have on your clothing and skin. Varying sized cartridges and sausage packs from different manufacturers compound such lodging problems. Whether the removal of the used casing or sausage pack is with a tool or by hand, wastes an operator's time and a cost to productivity.

SUMMARY

One aspect of the present disclosure includes a control assembly for a material dispenser includes a plunger movably located within a bore of the assembly, the plunger having first and second ends, the first end having an abutment for moveably retaining the plunger within the bore and the second end for engaging a switch during operation of the material dispenser to cease operation. A biasing member located within the bore, the biasing member engaging the first end of the plunger, the biasing member allowing for the manual movement of the plunger after electrical shutoff without harm to the switch of the material dispenser during use.

Another aspect of the present disclosure includes a method of controlling the travel in a power material dispensing tool. The method comprises the steps of: positioning a moveable plunger within a bore of a control assembly, the plunger having first and second ends; moveably retaining the first end by providing an abutment on the first end of the plunger and positioning the abutment within the bore; operatively engaging a switch during operation with a projection located at the second end of the plunger, the engagement changing a stats of a motor that is disposed within the assembly; and biasing the plunger at the abutment end within the bore with a biasing member, the biasing member allowing for the manual movement of the plunger without harm to the switch of the material dispenser during use.

While another aspect of the present disclosure includes a power tool comprising: a control assembly having a housing for supporting a plunger fixedly located within a bore of the housing, the plunger features first and second ends, the first end having an abutment for retaining the plunger within the bore and the second end for engaging a switch during operation of the tool to perform an operation; a biasing member is located within the bore. The biasing member engages the first end of the plunger and allows for the manual movement of the plunger after electrical shutoff without harm to the switch of the tool during use.

BRIEF DESCRIPTION OF THE SEVERAL VIEWS OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which.

Figure 1A:
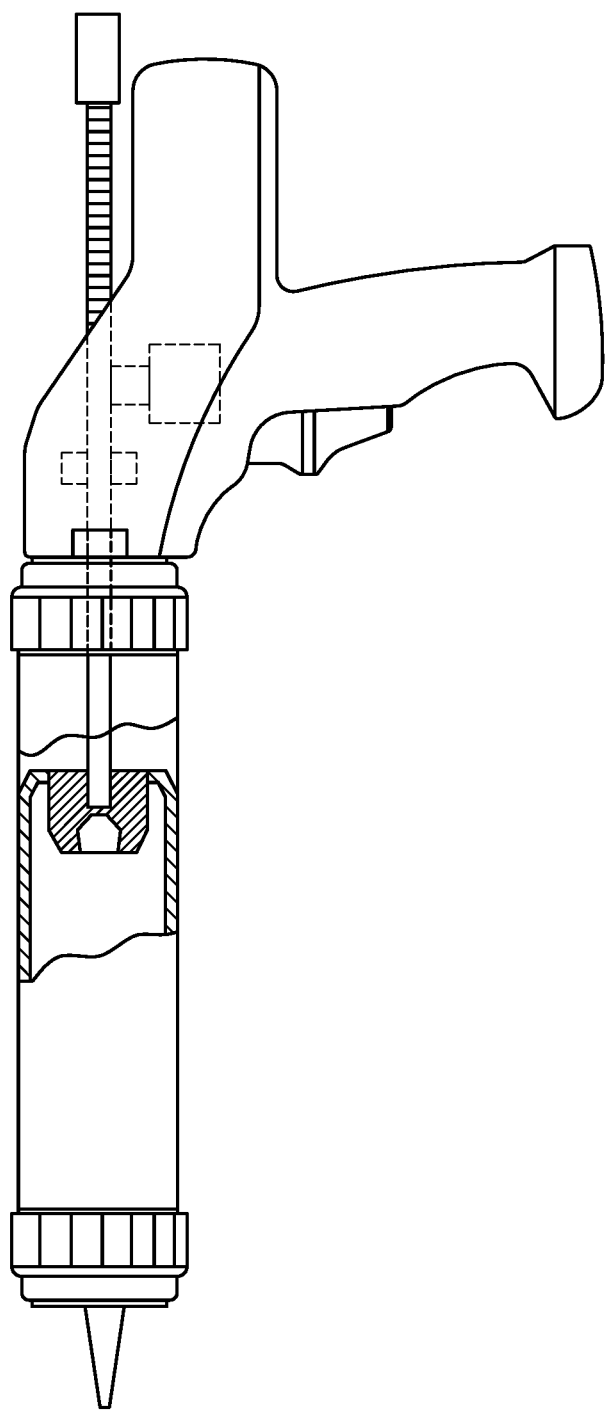
FIG. 1A illustrates a piston pushing against the sausage pack within the barrel of the tool understood in the prior art.
Figure 1B:
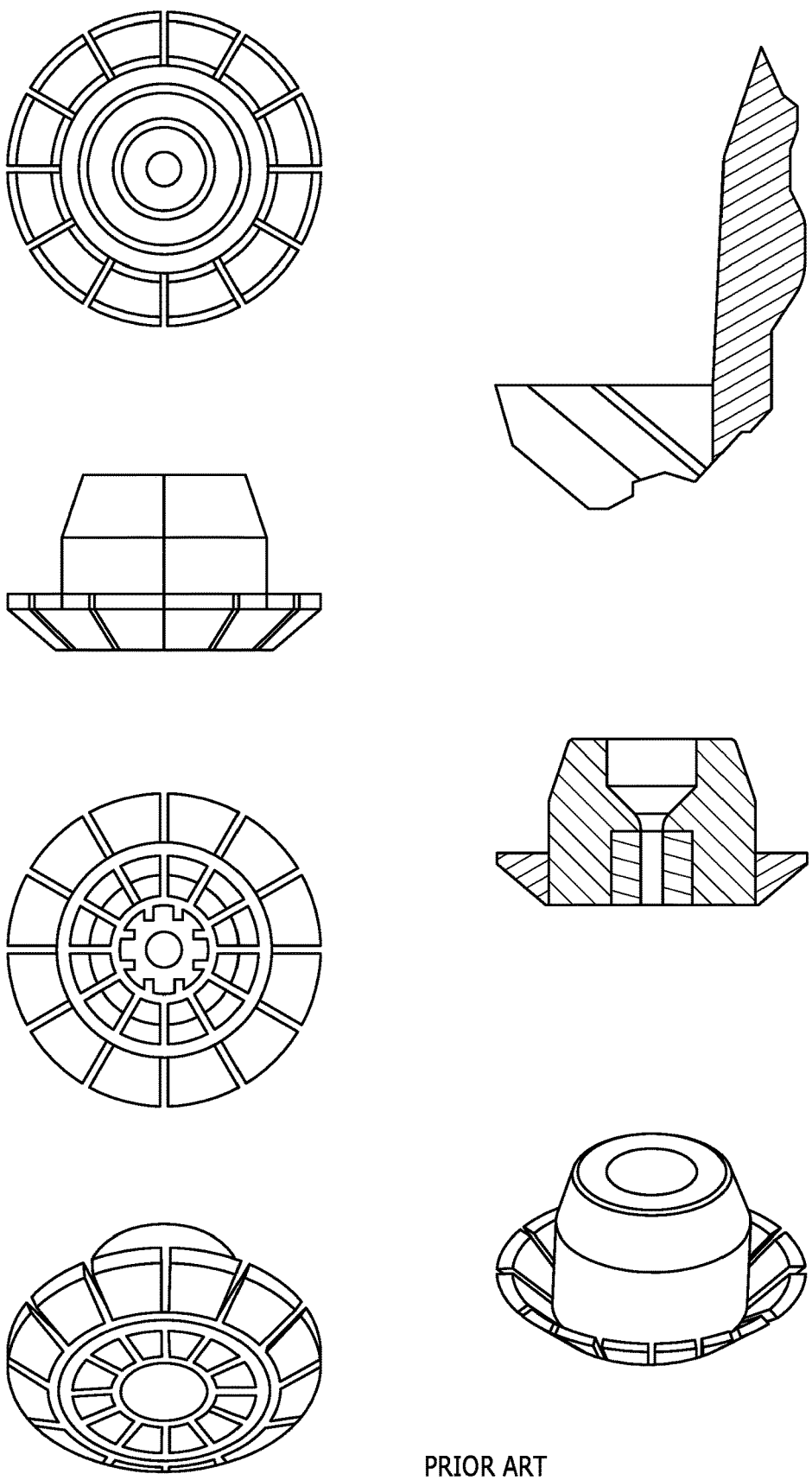
FIG. 1B illustrates assignee's patented piston as further described in U.S. Pat. No. 8,950,627.
Figure 1C:
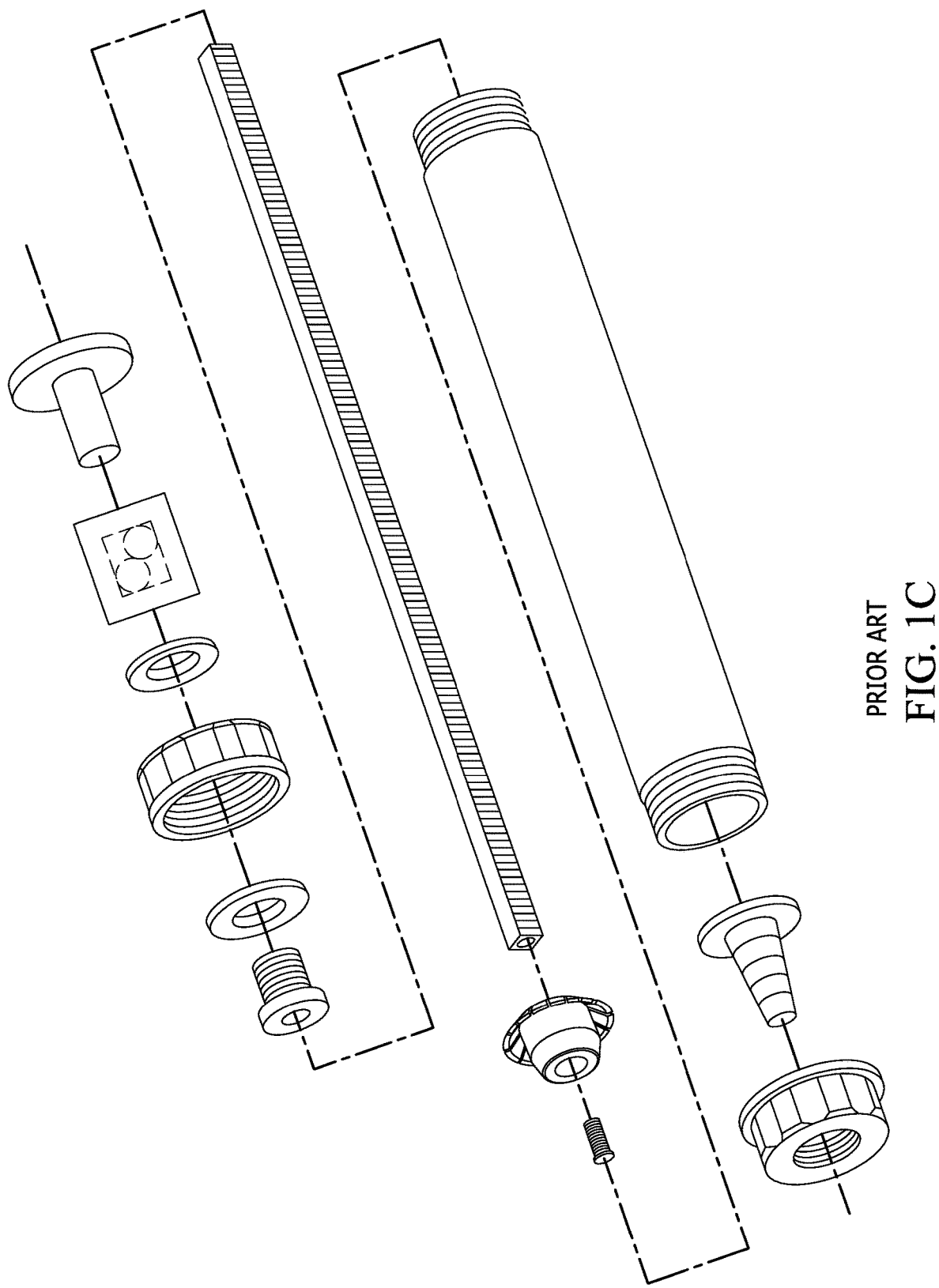
FIG. 1C illustrates an exploded view of a conventional barrel assembly.
Figure 1D:
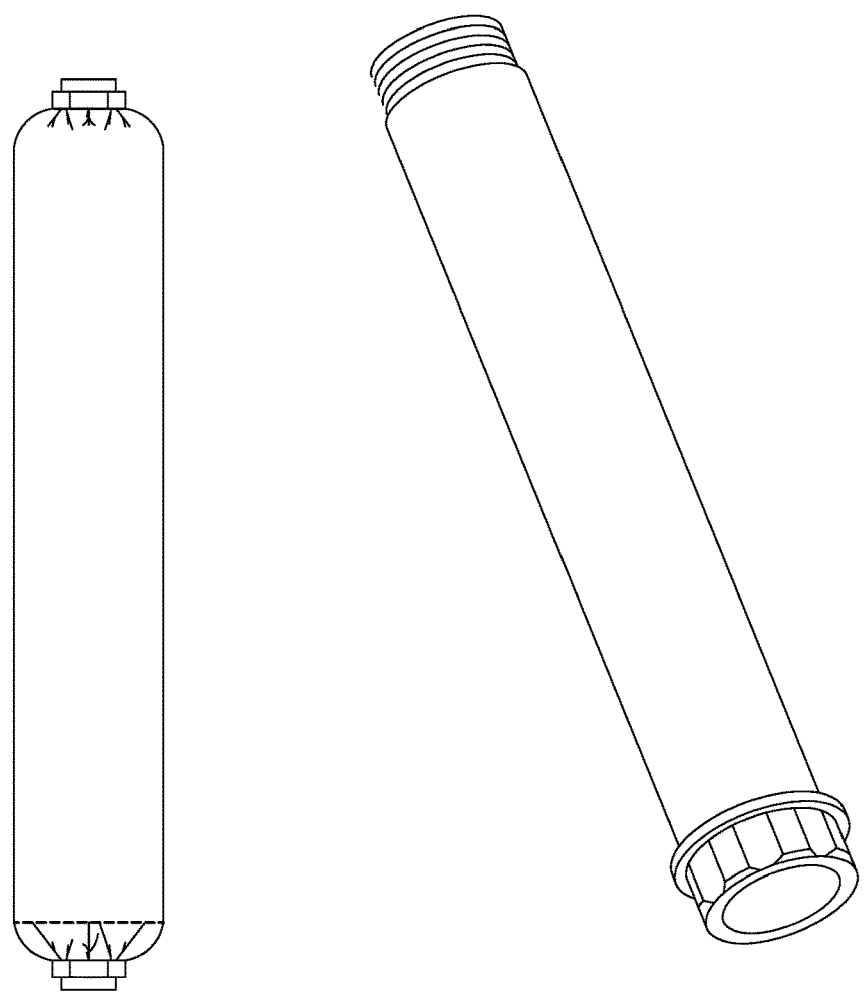
FIG. 1D illustrates a sausage pack/holder and barrel.
Figure 1E:
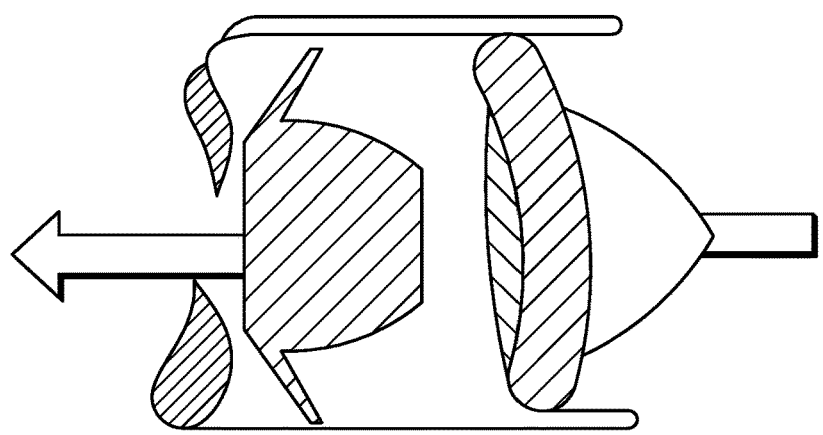
FIG. 1E illustrates the piston being retracted from the sausage pack and the resultant pack shape that is typically lodged at the distal end of the barrel when the process is complete.

Skilled artisans will appreciate that elements is the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Referring now to the figures generally wherein like numbered features shown therein refer to like elements having similar characteristics and operational properties throughout unless otherwise noted. The present disclosure relates to a material dispenser controller assembly. More specifically, the present disclosure relates to a material dispenser controller assembly that limits the travel of a rack and piston moving in a barrel or tube of a material dispensing tool.

It is common to stop a tool by an electrical shutoff, such as releasing a trigger. It is problematic, however that different stopping locations may be required for different configurations or cartridges or sausage packs, and that subsequent to terminating the power or "shutoff", additional forward travel motion would be advantageous for expelling all material that may remain in the cartridge or sausage. The cartridge and sausage pack configurations will differ between manufacturers, thus some will be left with material in the barrel or tube when the cycle is complete because of the variations in types, specifications and manufacturers. The material dispenser controller of the present application and embodiments discussed and illustrated herein remedy such issues.

Figure 1:
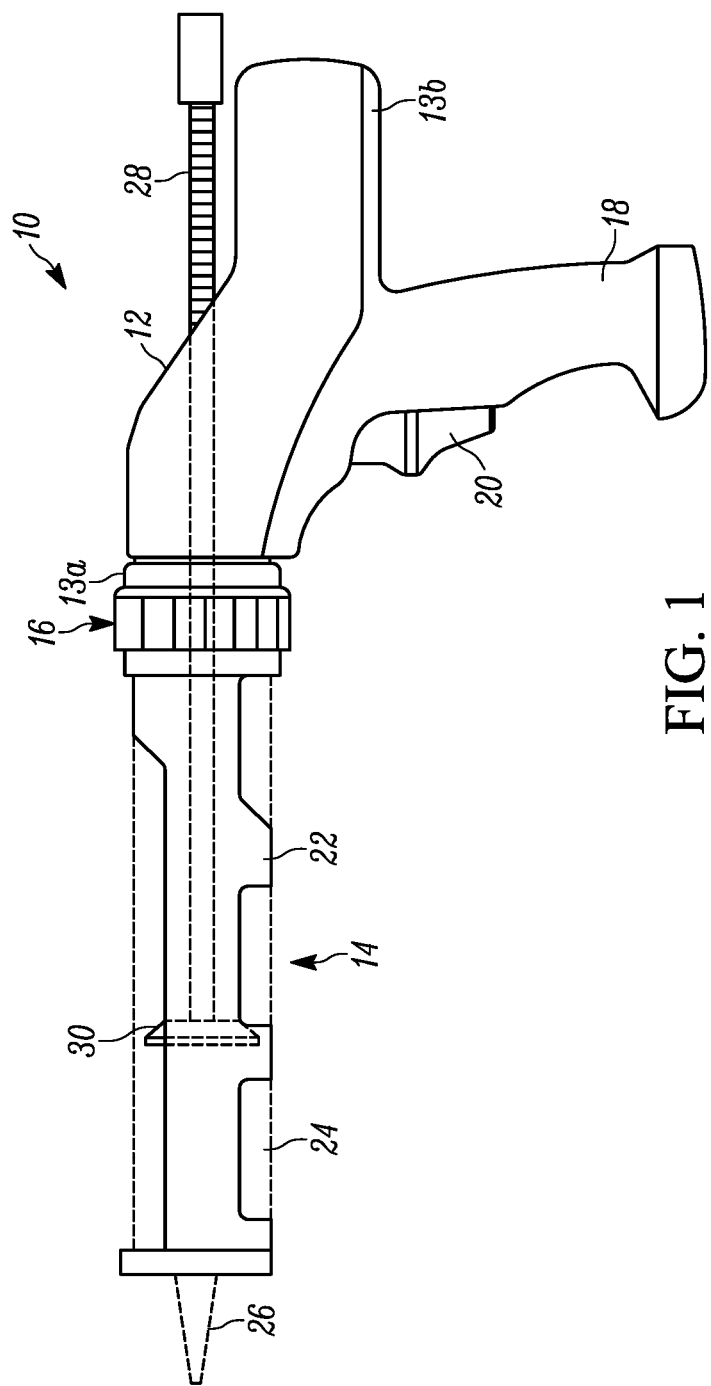
FIG. 1 is a dispensing tool constructed in accordance with one example embodiment of the present disclosure.

Illustrated in FIG. 1 is a one-part dispensing tool 10 having a body 12 and a cartridge support assembly 14. The cartridge support assembly 14 is attached to the body 12 through its locking assembly 16. The body 12 includes first and second ends 13a, 13b, respectively, a handle portion 18, and a trigger 20 projecting from the handle portion for engagement by an operator of the dispensing tool 10. The cartridge support assembly 14 further includes a cartridge or sausage bag support tube or barrel 22 for supporting a cartridge 24 (shown in phantom) or sausage bag. The support tube or barrel 22 includes a dispensing nozzle 26 (also shown in phantom) for dispensing any number of materials, including, but not limited to, adhesives, lubricants, and sealants. The cartridge or sausage support tube or barrel 22 in the illustrated example embodiment of FIG. 1 is molded from a polymeric material, but could also be made from metal and from any other process without departing from the spirit and scope of the claimed disclosure.

An elongated rod 28 extends from the body 12 and is axially advanced through the body into the cartridge or sausage support assembly 14 and cartridge or sausage bag 24 upon activation of the trigger 20. A piston 30 is connected to a forward end of the rod 28, such that axial movement of the rod will cause comparable axial movement of the piston, resulting in the dispensing of material from dispensing nozzle 26 of the cartridge or bag 24 upon advancement.

Motion enabling mechanisms of the rod 28 and piston 30, such as an electric motor, controls and gearing are located within the body for advancement and retraction the rod and piston. In the illustrated example embodiment of FIG. 3A the rod 28 includes a rack or tooth portion for engagement by a pinion of a gear assembly 66. Upon engagement of the trigger 20 an internal motor 68 would provide movement in the gear assembly 66, engaging the rod 28 for either advancement or retraction of the rod through the body 12. The motion enabling mechanisms for advancing and retracting the rod 28 and piston 30 through the body 12 could alternatively be achieved by other constructions known by those skilled in the art, such as a screw-gear assembly without departing from the spirit and scope of the claimed invention.

Figure 2A:
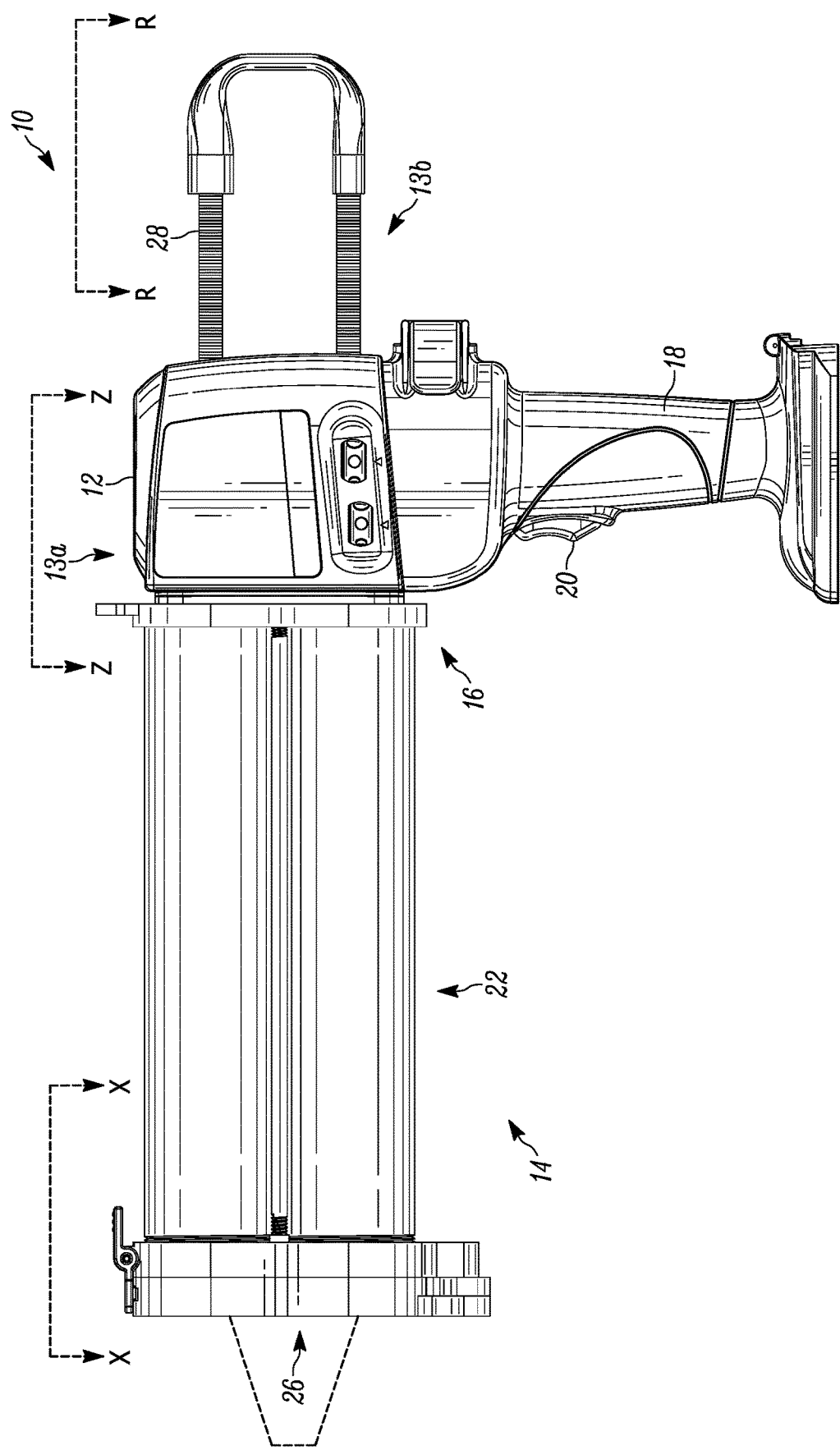
FIG. 2A is a dispensing tool constructed in accordance with another example embodiment of the present disclosure.
Figure 2B:
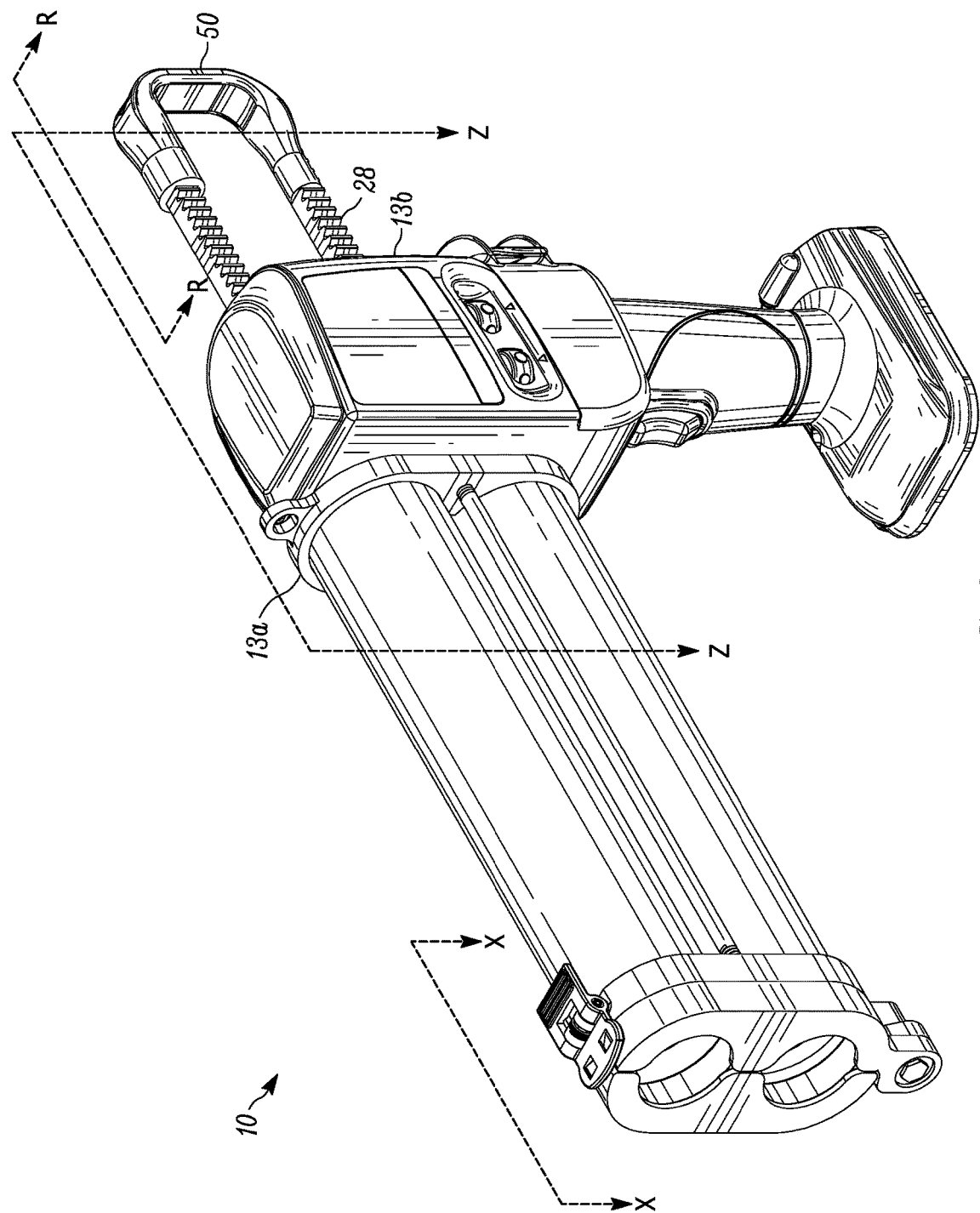
FIG. 2B is a dispensing tool constructed in accordance with another example embodiment of the present disclosure.

Illustrated in FIGS. 2A and 2B is a two-part dispensing tool 10 that simultaneously dispenses and mixes for example a bonding agent and a hardening agent together sufficiently at the nozzle 26 with the activation of the trigger 20. Both the one-part and two-part dispensing tools are contemplated to be used with the present disclosure.

Figure 7:
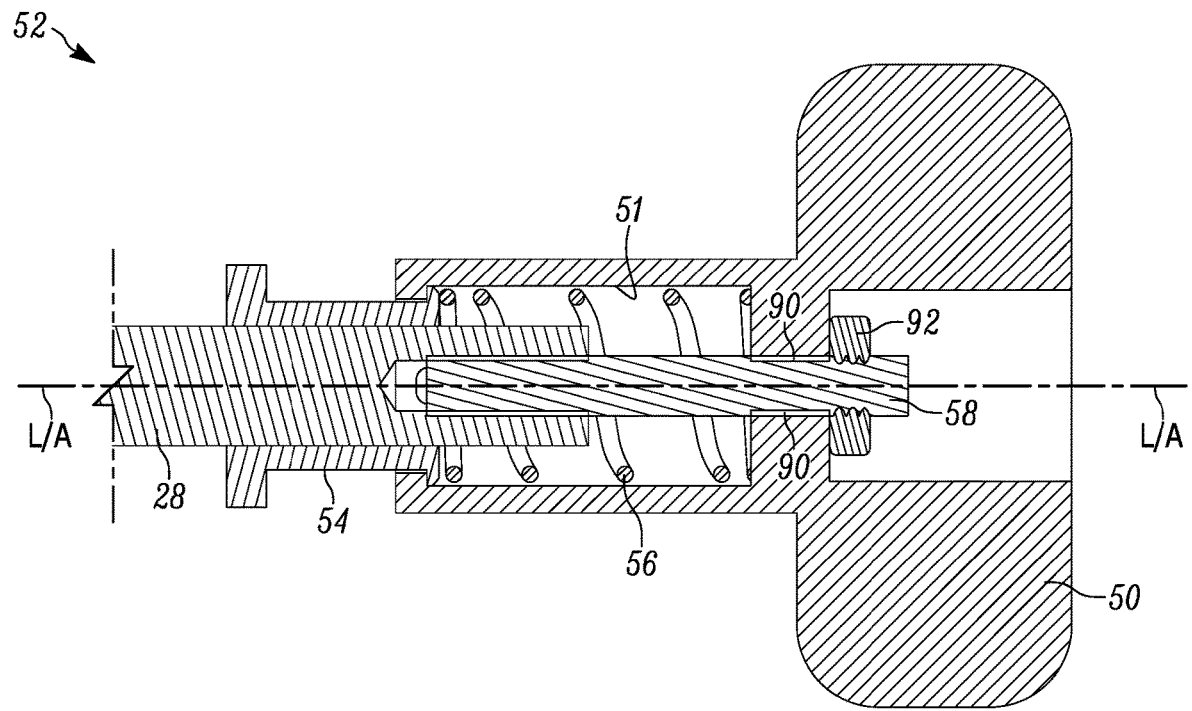
FIGS. 7-23B are section views of FIGS. 1 and 2 along section lines R-R.

FIGS. 3A-3C and FIGS. 4A-4D illustrate a section view of the tool 10 housing of FIGS. 1 and 2, exposing the internal working of the tool. In particular, the housing 13, includes first and second ends 13a and 13b, respectively, the rack during advancing operating moving in the direction of arrow A. The rod 28 being a rack comprising a series of teeth advanced by a gear 66 and motor 68 assembly as would be appreciated by one of skill in the art. Located on the rack 28 is a handle 50 being either a single handle for a single component tool 10 (see FIG. 1) or dual handle for a dual component tool 10 (see FIGS. 2A and 2B). The handle 50 includes an inner cavity 51 for receiving the rack 28 as illustrated in FIG. 7. FIG. 7 further illustrates a control assembly 52 that comprises a plunger 54, biasing member 56, adjustment screw 58, handle 50, and rack 28. The control assembly 52 operates with a control arrangement 60 that includes a limit switch 62, limit switch lever 64, gear train 66, and motor 68, as illustrated in the example embodiment of FIG. 3A.

During operation, the control assembly 52 interacts to direct the amount of travel of the rack 28 during operation (engagement of a trigger 20 to energize the motor 68 and gear train 66) to advance the rack and piston 30 through the barrel along the longitudinal axis LA. While FIGS. 3A-4D illustrate just one method of electrical shutoff, many others switches are contemplated as being within the scope of the present disclosure. For example, the switches could be magnetic, optical, hall effect, any combination thereof, and the like.

Figure 3A:
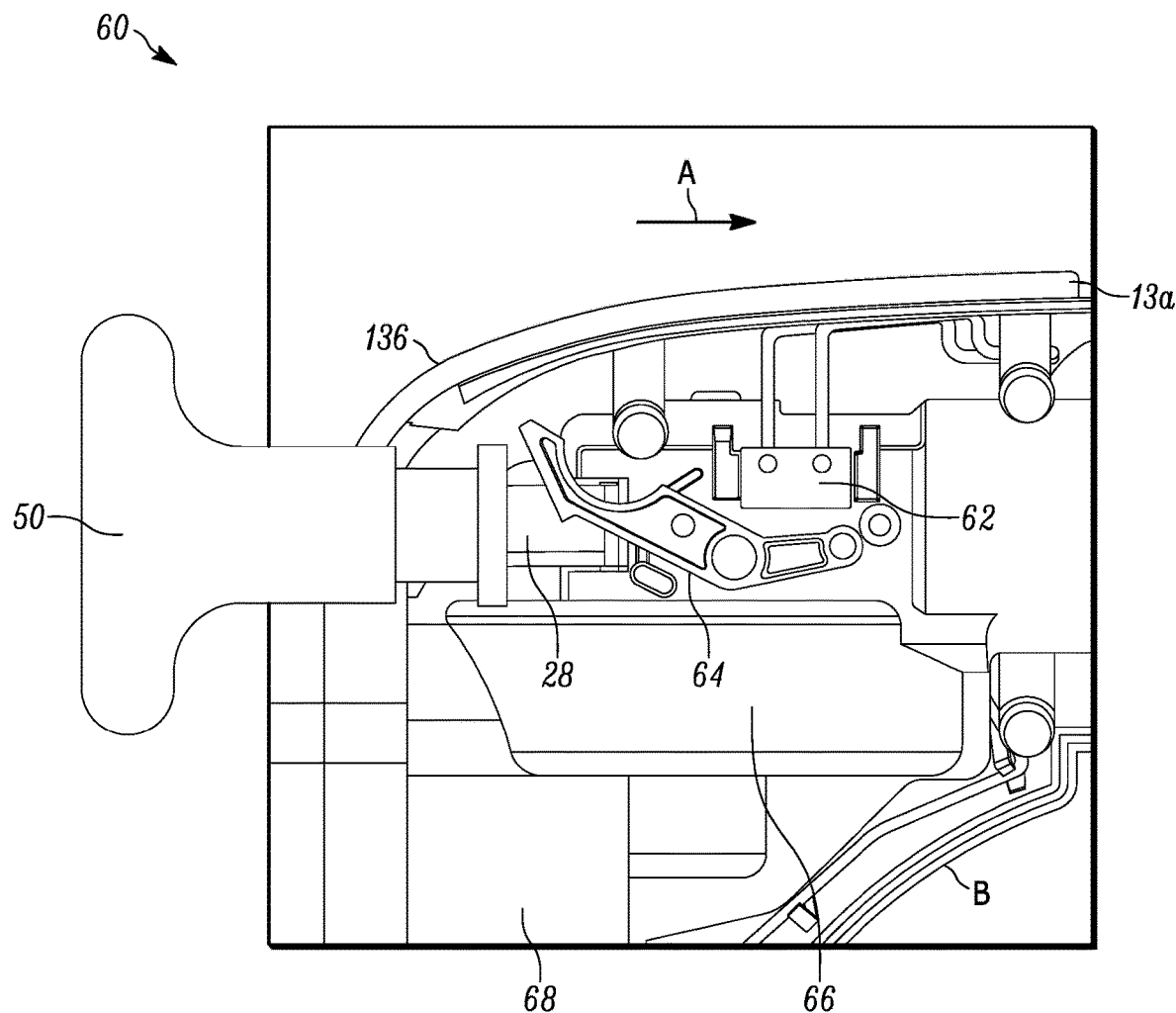
FIG. 3A-3C, 4A-4D, 5A 6A, are section view of FIGS. 1 and 2 along section lines Z-Z.
Figure 3B:
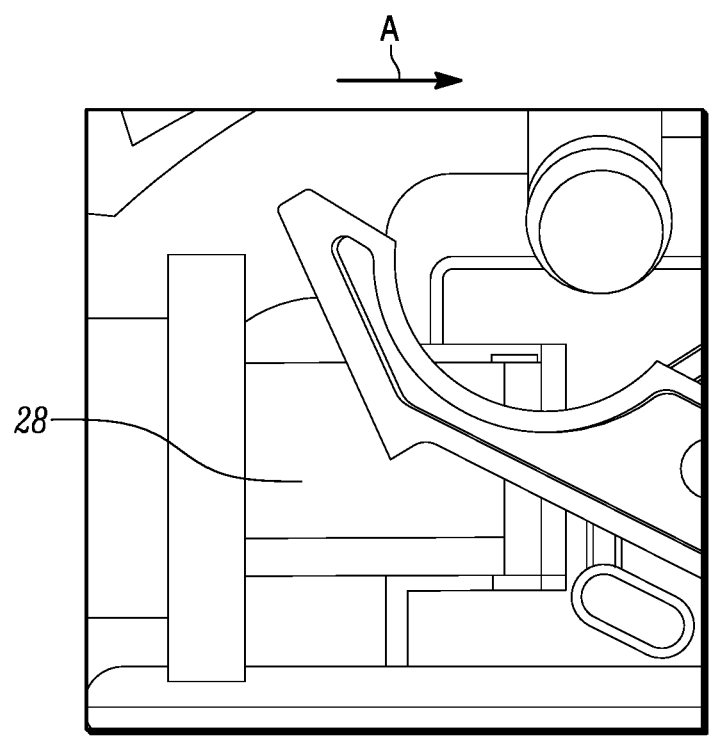
Figure 3C:
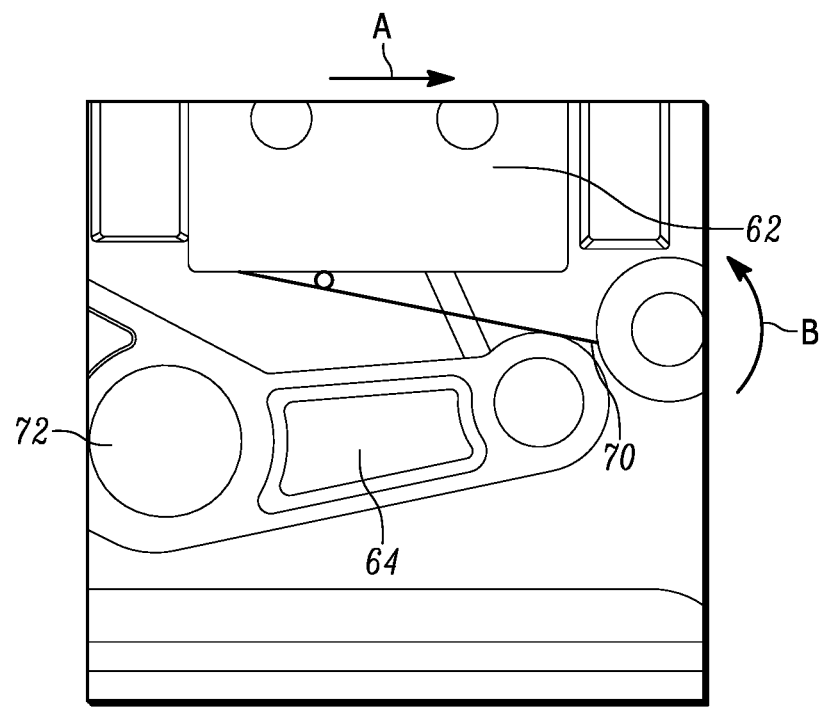
Figure 4A:
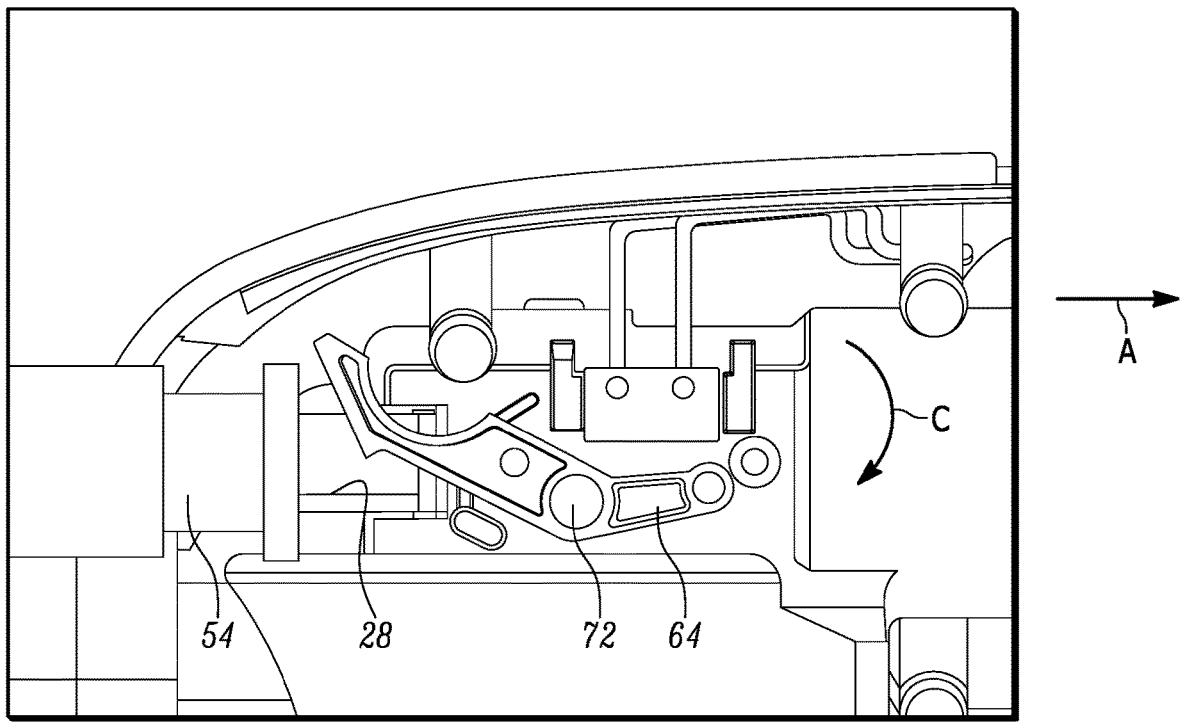
Figure 4B:
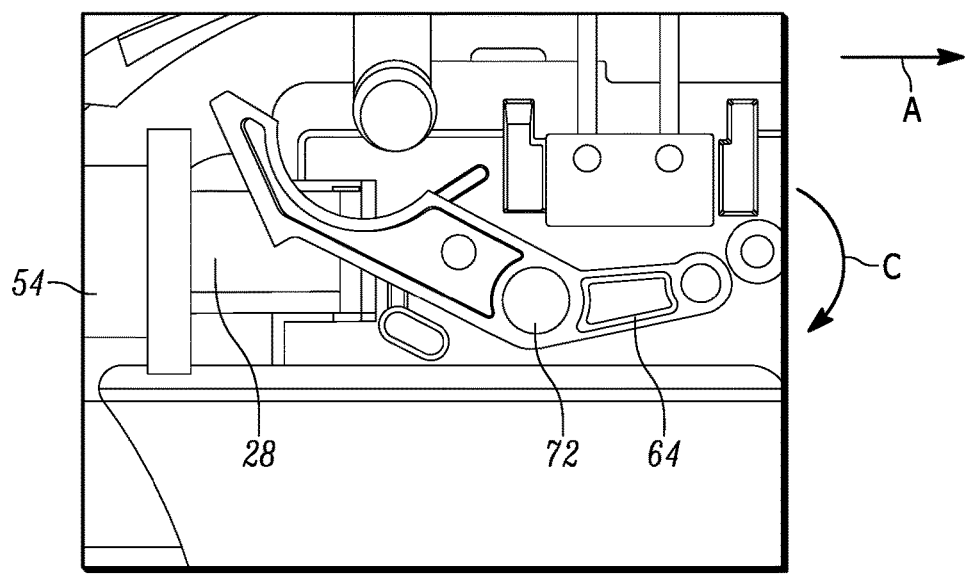
Figure 4C:
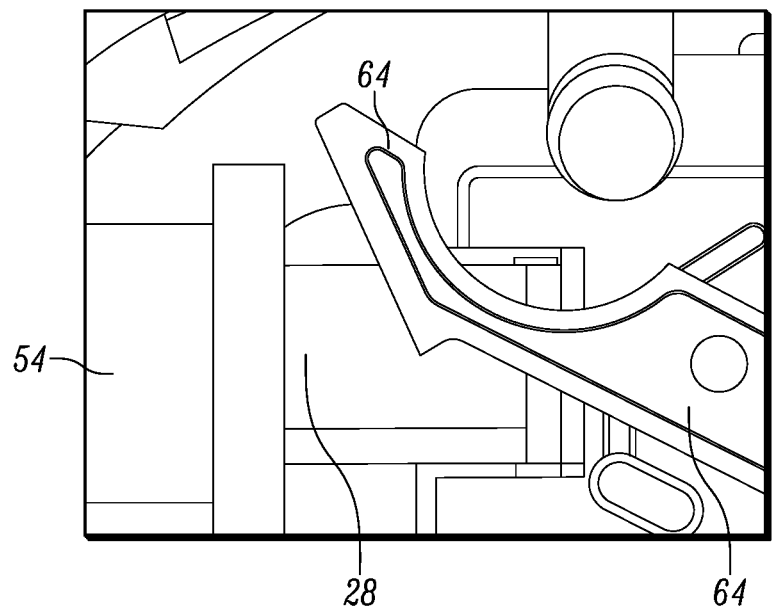
Figure 4D:
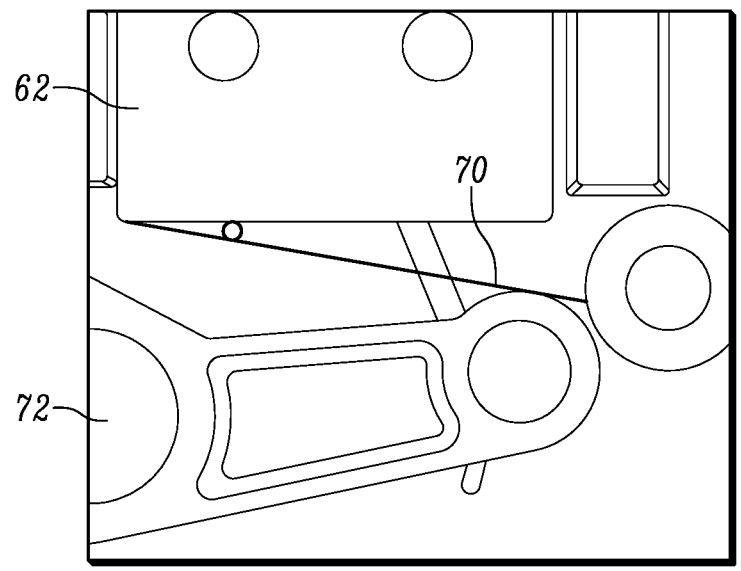

FIGS. 3A-3B illustrate the normal operation of the tool 10, advancing the rack 28, piston 30, and material from the tool before an electrical stopping point is reached, controlled by the limit switch 62 and control assembly 52, the limit switch lever 64 remaining in the position shown therein. In this normal operation position, the limit switch includes a wiper 70 engaged by the lever arm 64 in the direction of Arrow B in FIG. 3C and the tool 10 remains electrically on, advancing the rack 28 in the direction of Arrow A.

As the rack 28 reaches the desired end location of travel, the rack, and in particular the plunger 54 engages the lever 64, causing rotation of the lever at a pivot point 72 in direction of Arrow C away from the wiper 70, thus electrically terminating operation of the motor 68, gear assembly 66, and advancement of the rack, as illustrated in FIGS. 4A-4D. This signals the tool 10 that the rack 28 has reached the end of the dispensed material sausage or cartridge.

Figure 5A:
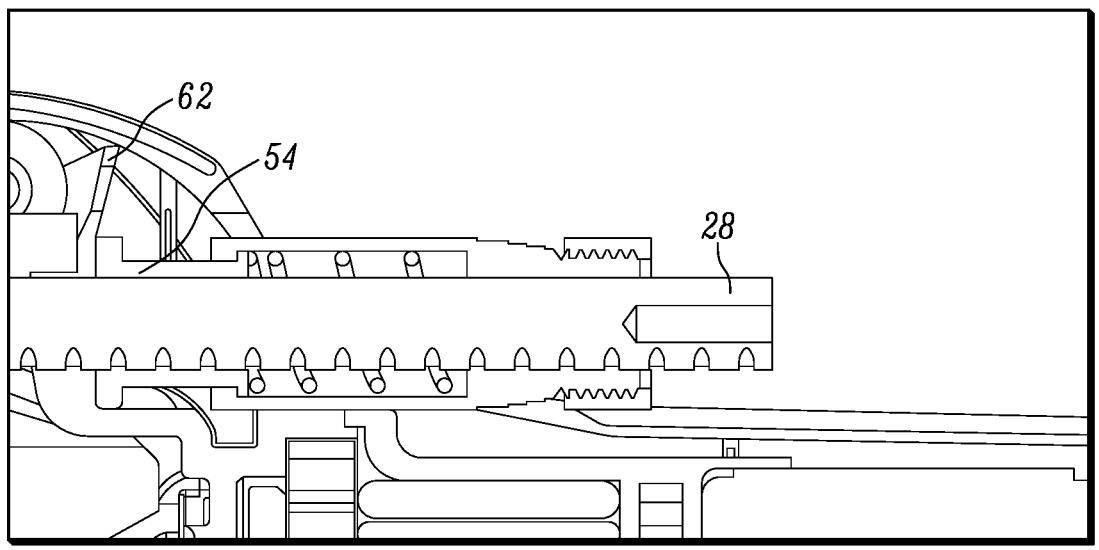
Figure 5B:
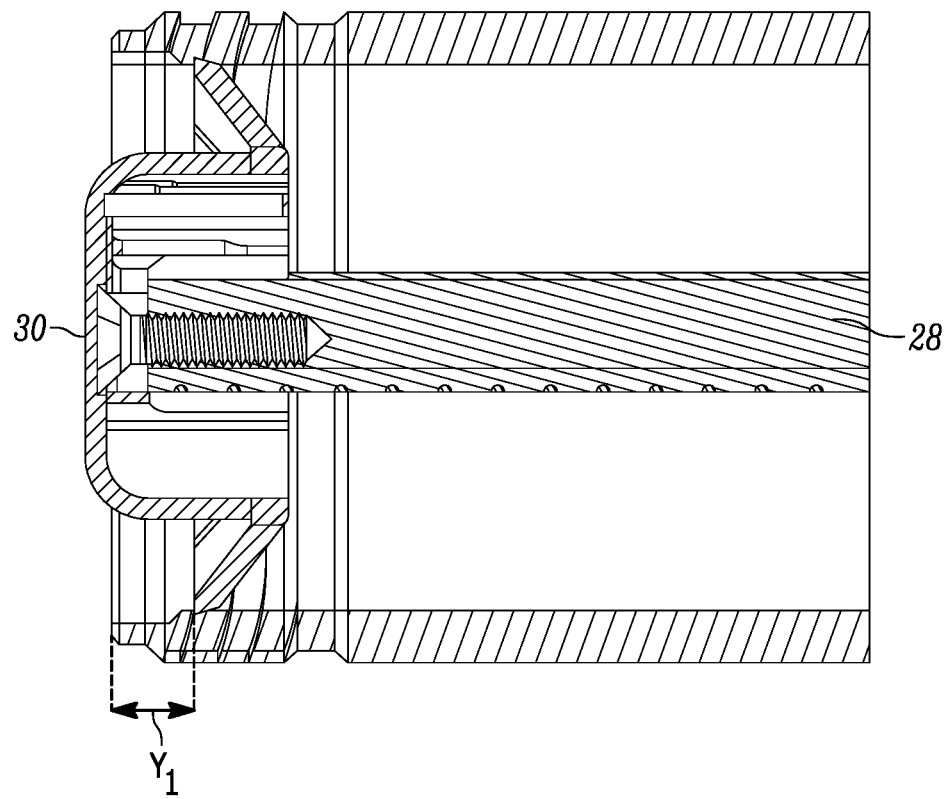
FIGS. 5B, 6B are section views of FIGS. 1 and 2 along section lines X-X.

Referring now to FIG. 5A that illustrates the plunger 54 engaging the limit switch 62, indicating that the material within the sausage tube, barrel, or cartridge is completely dispensed as indicated in FIG. 5B. The tool 10 at this point remains electrically shut-off or disabled. After the limit switch 62 is engaged by the plunger, and thus, terminating the power to the tool, the operator of the tool pushes the back or rear end of the rack 28 or handle 50 forward in the direction of the Arrows Y in FIGS. 6A and 6B to eject the spent sausage bag (or empty casing) from the tube or barrel. The contraction of the control assembly 52 and arrangement 60 advantageously allow for the ejection of casing, keeping the operator's hands clean.

Figure 6A:
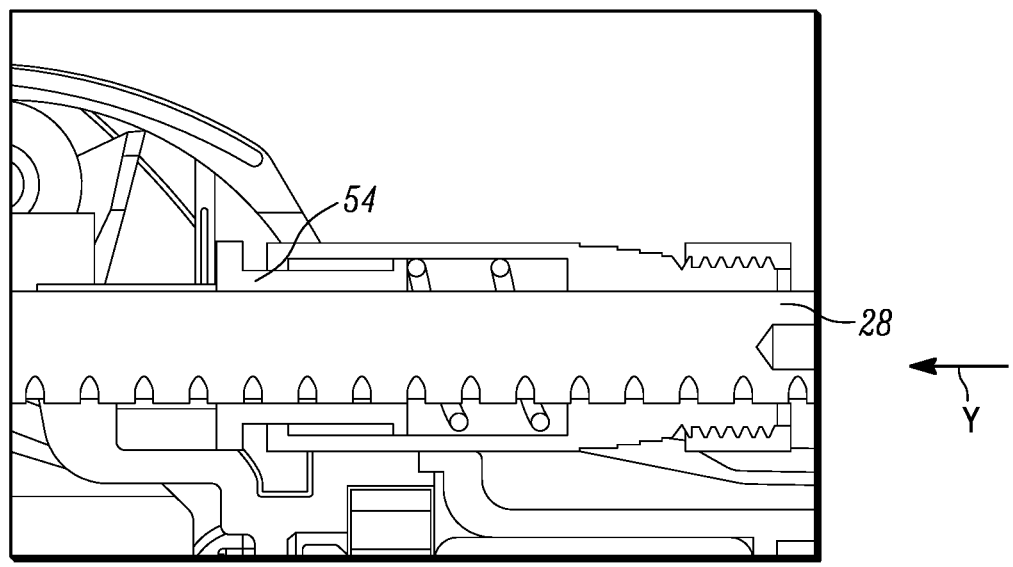
Figure 6B:
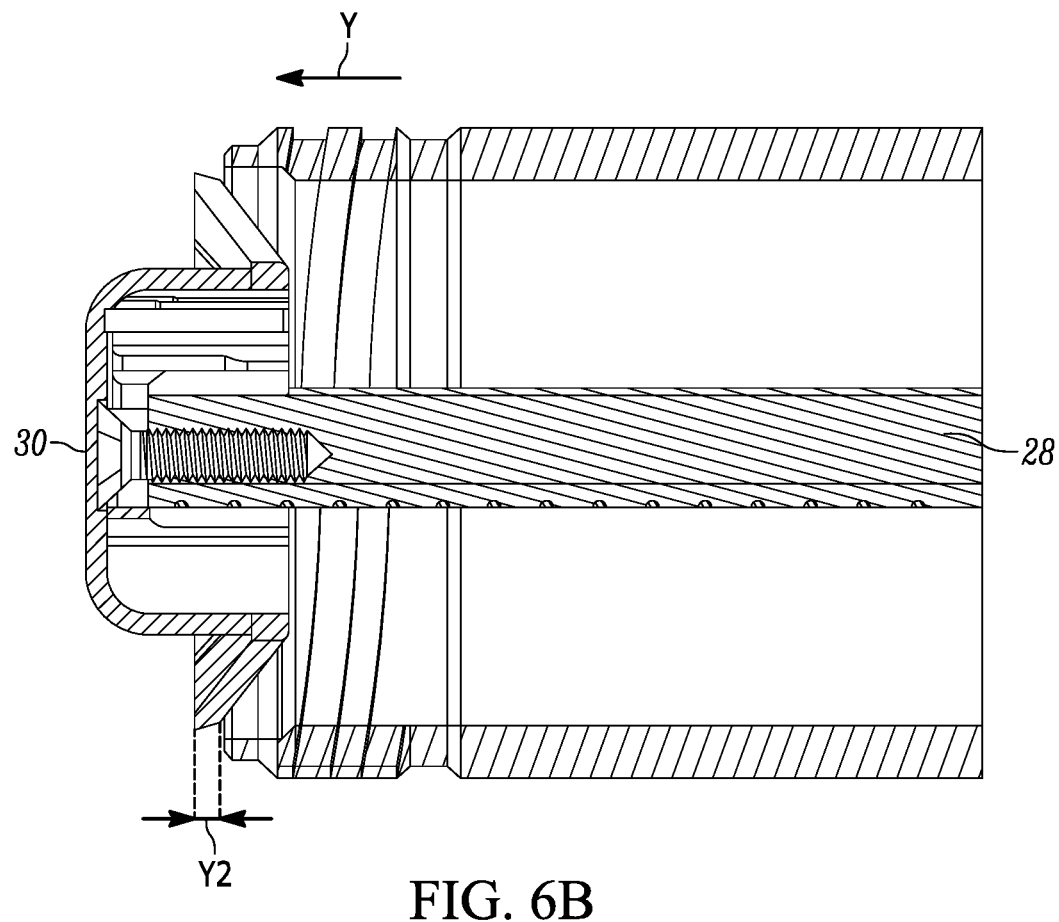

Because the plunger 54 is relieved (like a clutch) by the biasing member or spring 56 within the handle 50 bore 51 as illustrated in FIG. 7, the plunger can translate safely into the bore preventing injury to the limit switch 62 while ejecting the casing. This also allows the limit switch 62 to be actuated such that the power to the tool remains off. It can be seen in FIGS. 6A and 6B, illustrates the manual advancement when compared to the electrical stopping points of FIGS. 5A and 5B. The difference in piston 30 displacement is illustrated by the difference between the dimensions Y1 and Y2 from the end of the cartridge tube or sausage bag 24.

The control assembly 52 is again illustrated in FIG. 7. The plunger 54 makes contact with the limit switch 62. The spring 56 maintains a force to actuate limit switch 62 with the plunger 54 as the rack 28 advances while also allowing manually forced rack to travel past the limit switch's electronic stopping of the plunger 30. The adjustment screw 58 fixes the rack 28 to the handle. The handle 50 includes a threaded or tapped portion 90 to set the overall travel length of the rack 28 and piston 30 and is held into place by a lock nut 92.

Figure 8A:
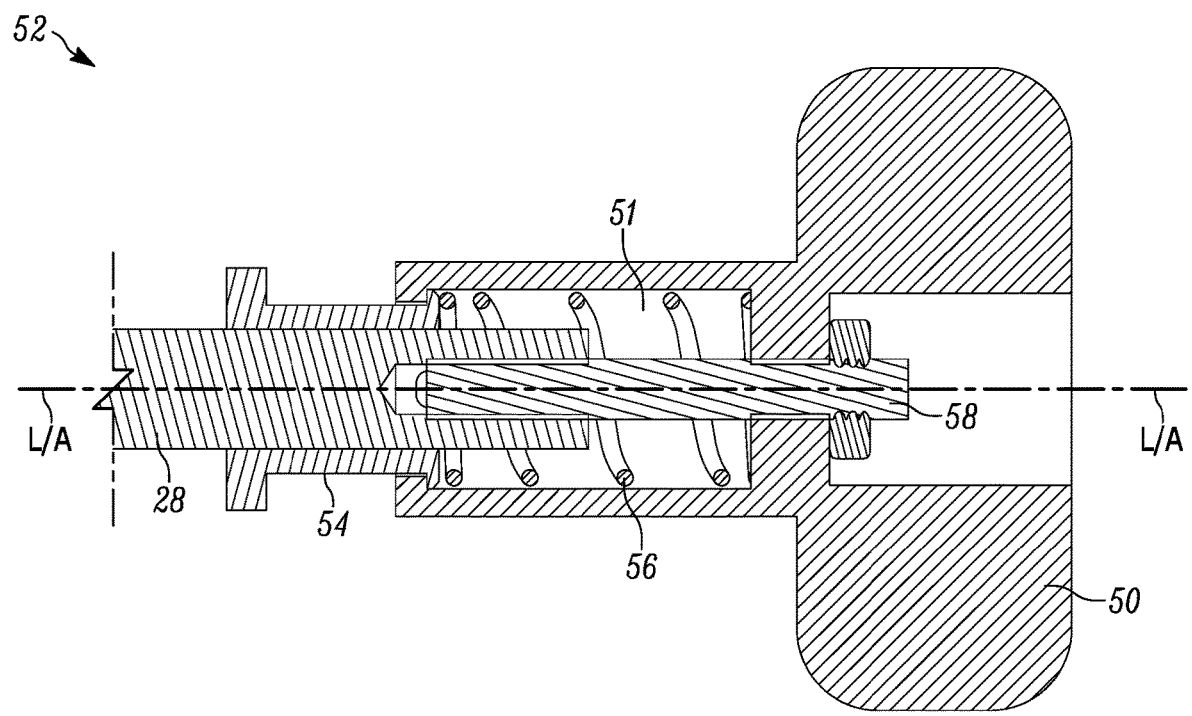
Figure 8B:
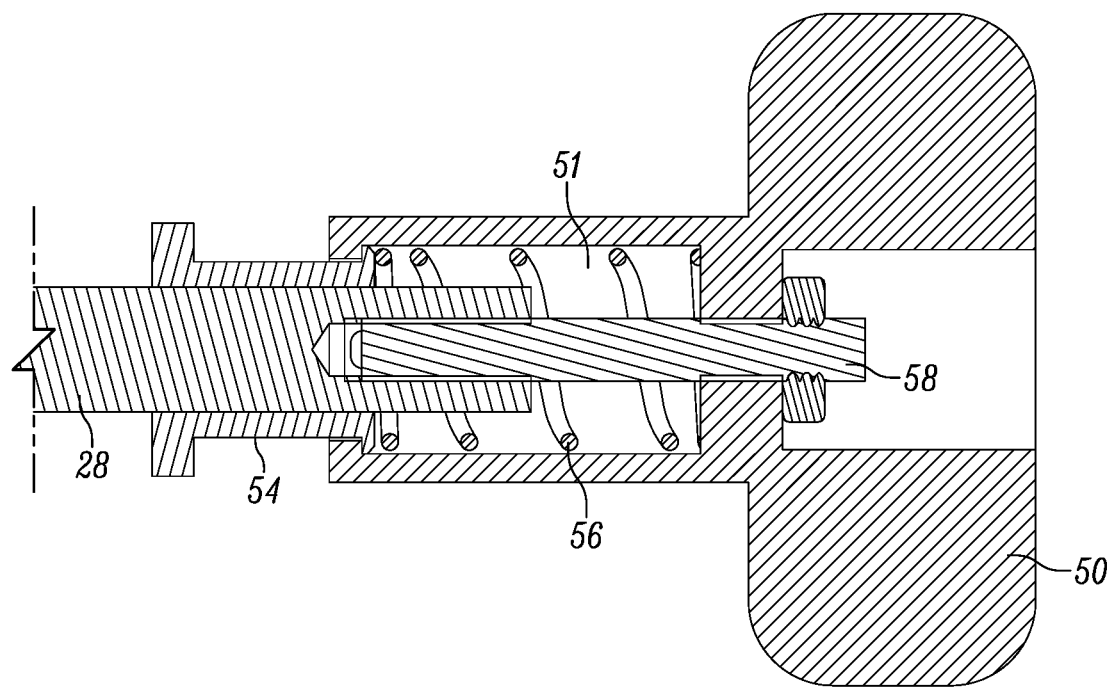
Figure 9A:
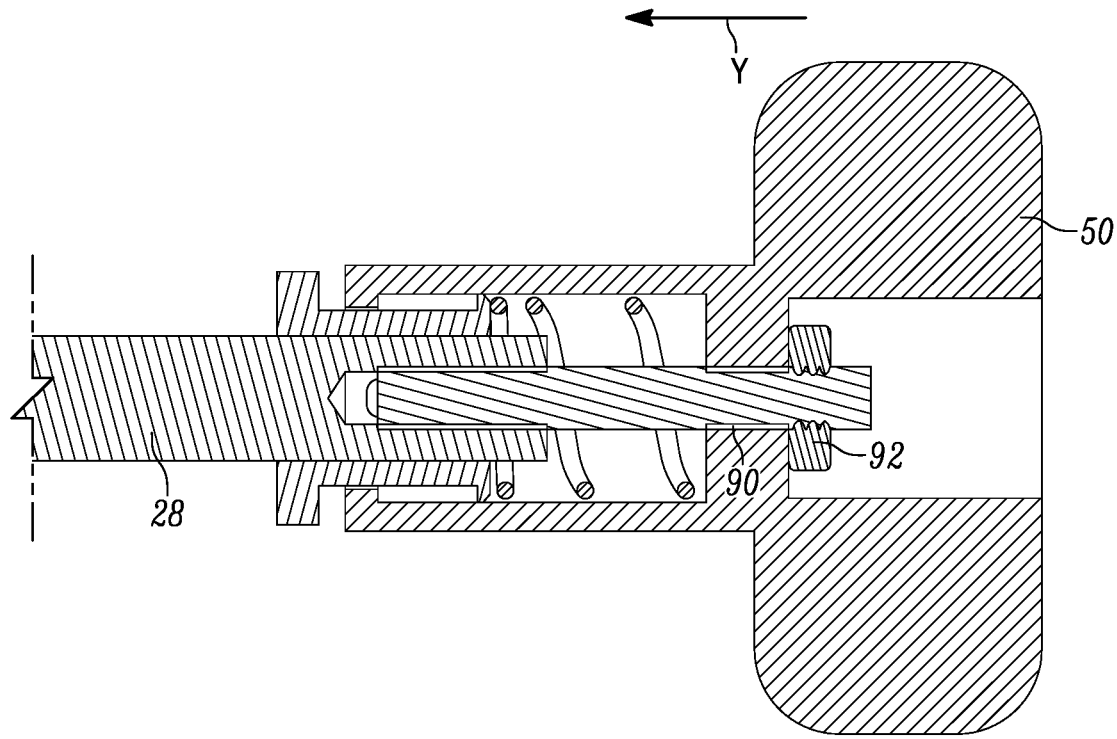
Figure 9B:
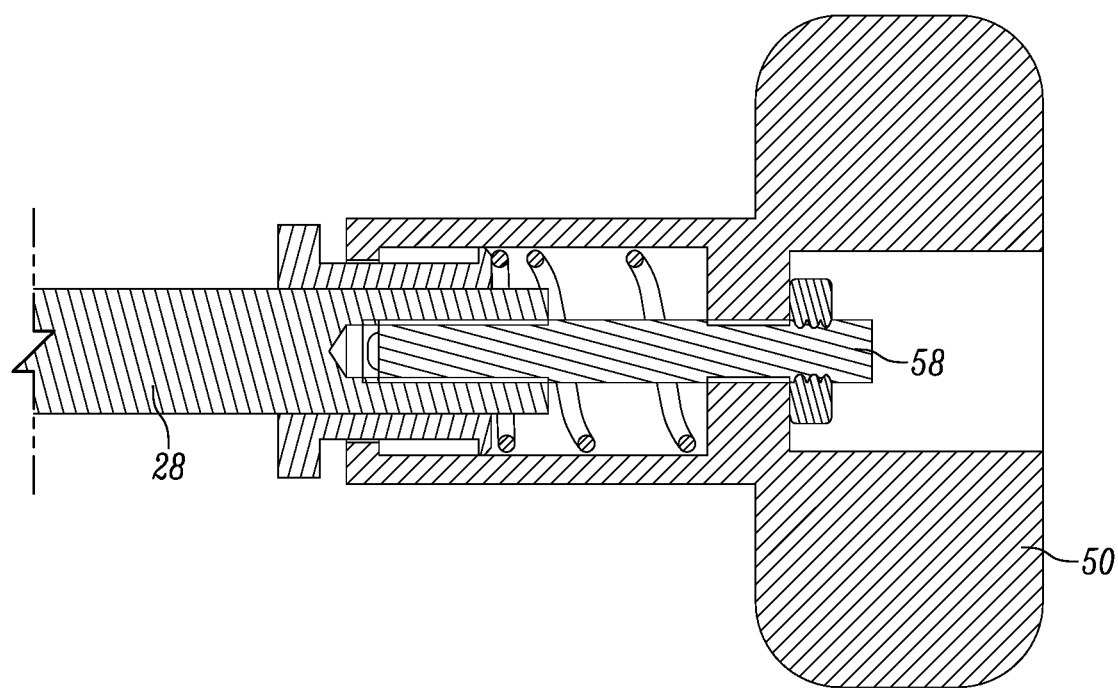

FIGS. 8A and 8B illustrate the normal operating position of the plunger 54 within the handle bore 51. FIGS. 9A and 9B illustrate the actuated position when the tool 10 is electrically off with the maximum mechanical position (by manually advancing the rack 28) is achieved.

Figure 10:
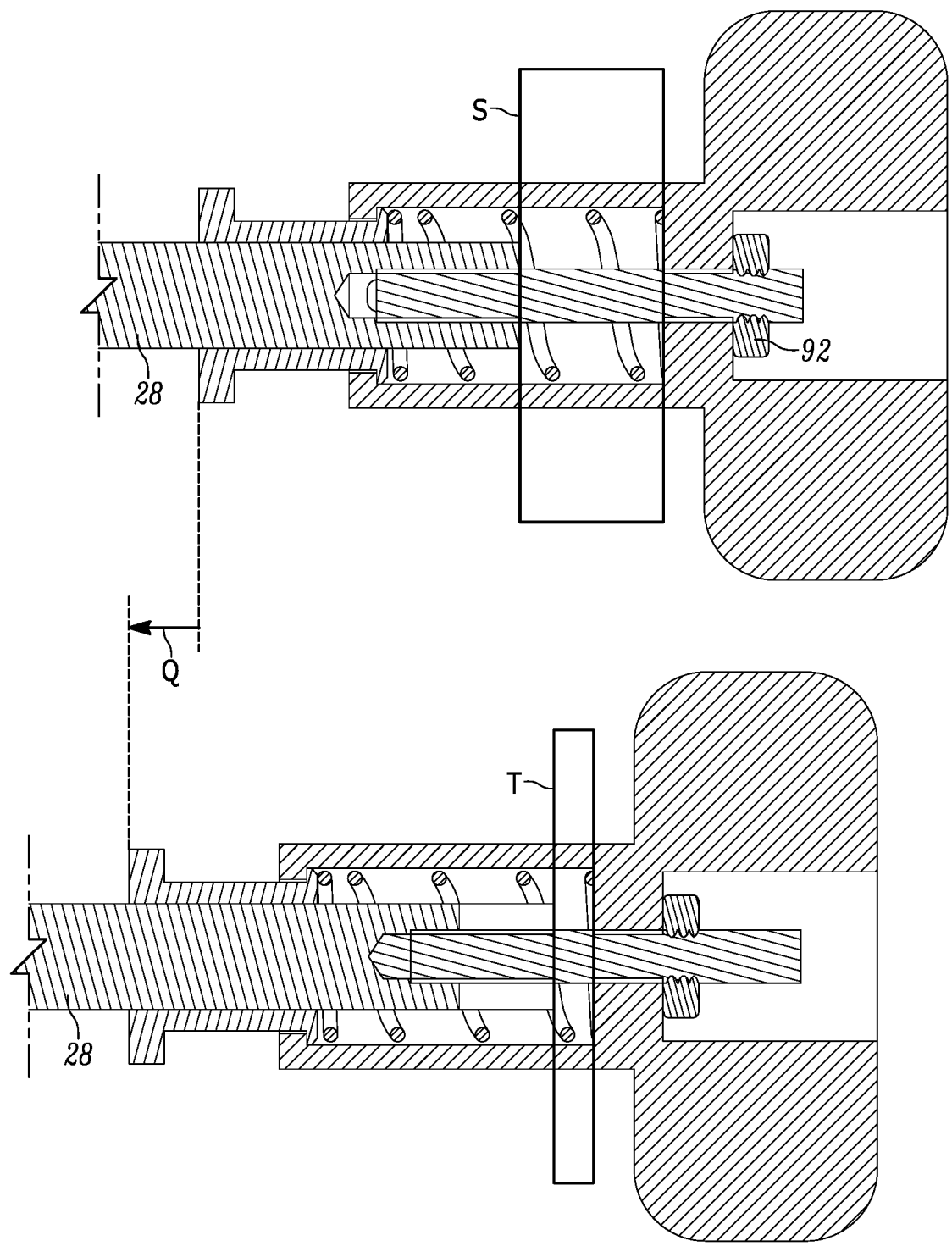

The depth adjustment for the amount of manual travel desired by the rack is illustrated in the example embodiment of FIG. 10. By adjusting the amount of depth or penetration of the adjustment lock nut 92 (see FIG. 10) within the rack 28 or out of the handle 50 changes the final travel distance of the rack 28, piston 30 and both the electrical and mechanical stopping positions. This difference is illustrated by dimension Q in FIG. 10 and the boxes S and T. The adjusting position of the handle 50 on the threaded rod 28, an earlier electrical shutoff position will be also achieved.

Figure 11:
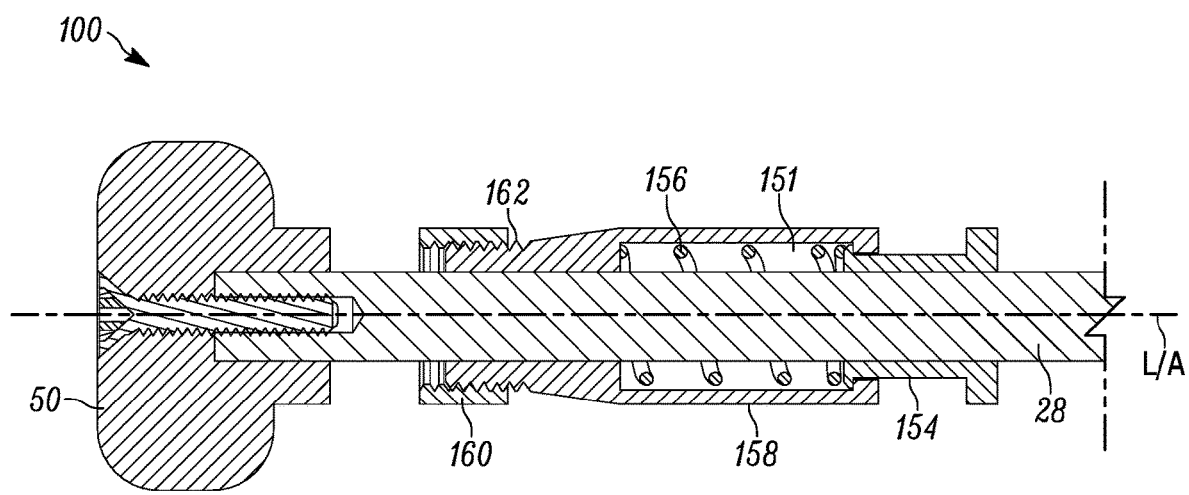

Illustrated in FIG. 11 is a control assembly 100 constructed in accordance with another example embodiment. The control assembly 100 comprises a plunger 154, spring 156, a body 158 and locating collar 160. The body 158 replaces the bored opening 51 in the handle 50 of the prior embodiments. The plunger 154 makes contact with the limit switch 62 to terminate the power to the tool 10. The spring 156 positioned within the bore 151 of the body 158 maintains force to actuate the limit switch 62 (like a clutch) while allowing a manually forced rack 28 travel past limit switch stopping. The threaded portion 162 of the body 158 holds the spring 156 and the collar 160 fixedly secures the body and desired position location along the rack 28. The collar 160 includes tapered threads fixing the body to a fixed position when tightened to the rack 28. The illustrated example embodiment of FIG. 11 advantageously facilitates the terminal locating of the electrical operation of the piston in a cartridge type tube, barrel, or sausage pack, as well allows for manual advancement for ejecting the used sausage casing. This advantageously prevents the user from getting dispensed material on their hands and/or tools.

Figure 12A:
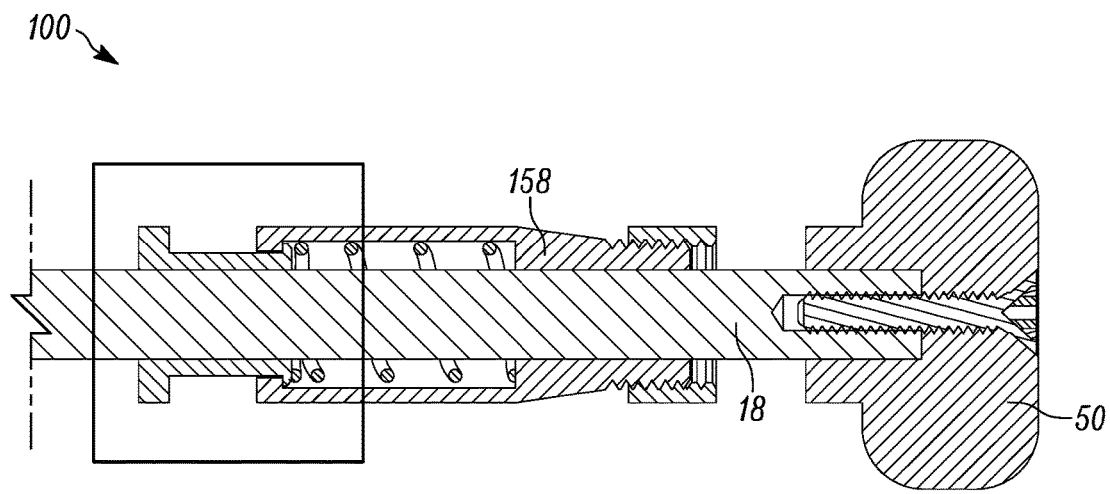
Figure 12B:
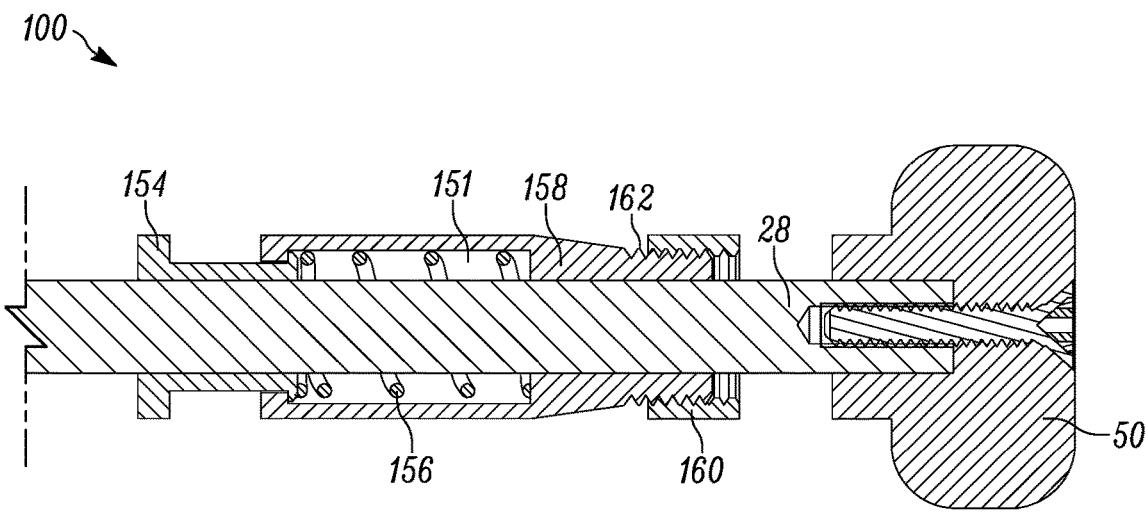
Figure 13A:
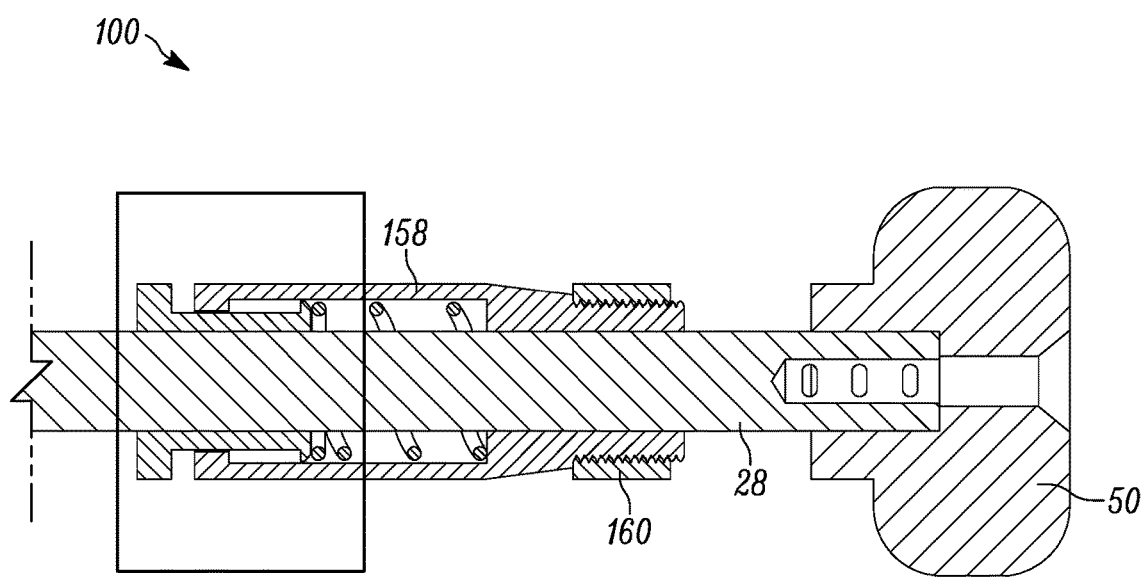
Figure 13B:
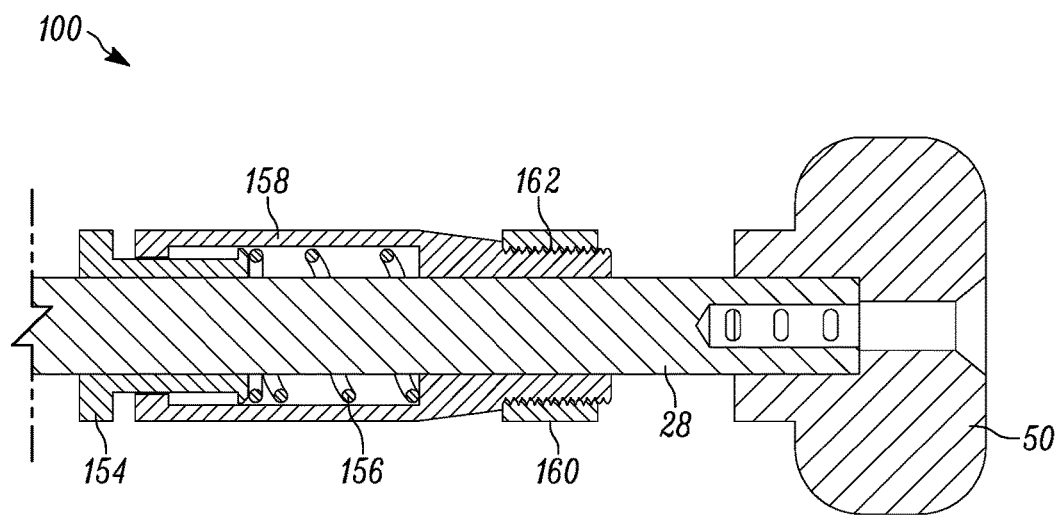
Figure 14:
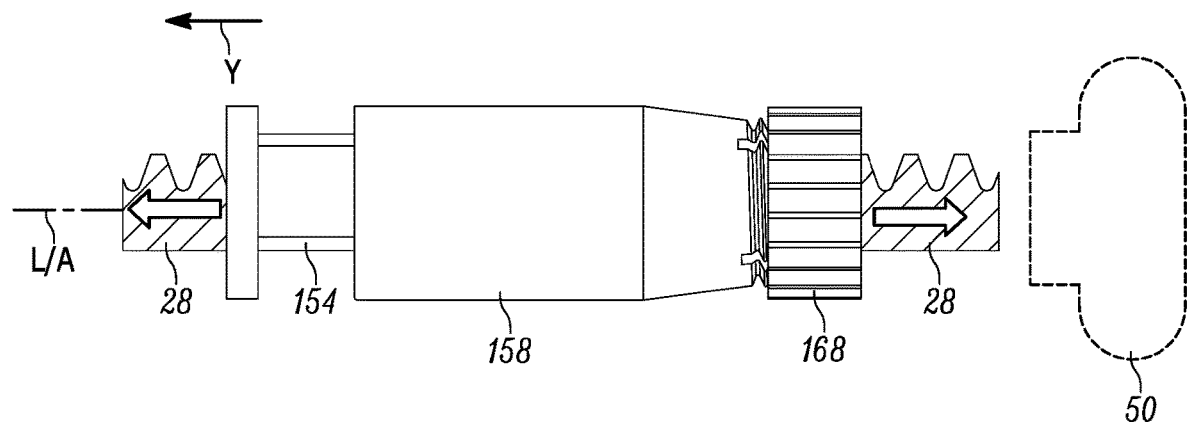

FIGS. 12A and 12B illustrate the normal operating position of the plunger 154 within the handle bore 151 of the control assembly 100. FIGS. 13A and 13B illustrate the actuated position when the tool 10 is electrically off with the maximum mechanical position (manually advancing the rack 28) is achieved. FIG. 14 illustrates a non-section view of the control assembly 100. The control assembly 100 allows for an unlimited number of positions for the plunger 30 location along the rack 28, advantageously controlling the piston travel distance for both sausage and cartridge type tools 10, minimizing the opportunity for over travel and motor damage. The unlimited number of locations along the rack 28 is achieved because the body 158 moves along the rack until locked and/or obstructed by the collar 160.

Figure 15:
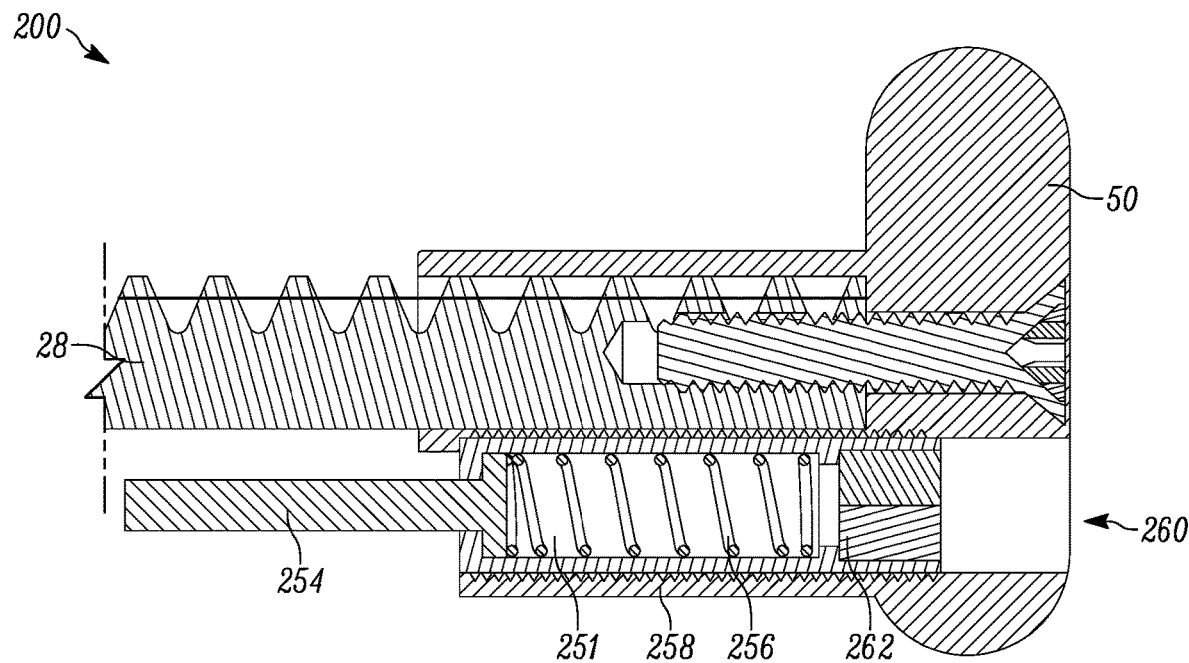

FIG. 15 illustrates a control assembly 200 constructed in accordance with another example embodiment in which the assembly 200 is eccentrically located or spaced from the rack 28. The assembly 200 comprises a plunger 254, a body 258 having a bore 251 nesting the moveable plunger 254 against a retained biasing member or spring 256. The handle 50 comprises a through hole for the positioning of the body and the location of the plunger based on a threaded or tapped hole 260 and a corresponding threaded body 258. The body includes a socket opening 262 for receiving an adjustment tool, such as an allen wrench for setting the depth of the plunger via location of the body relative to the handle 50.

Figure 16A:
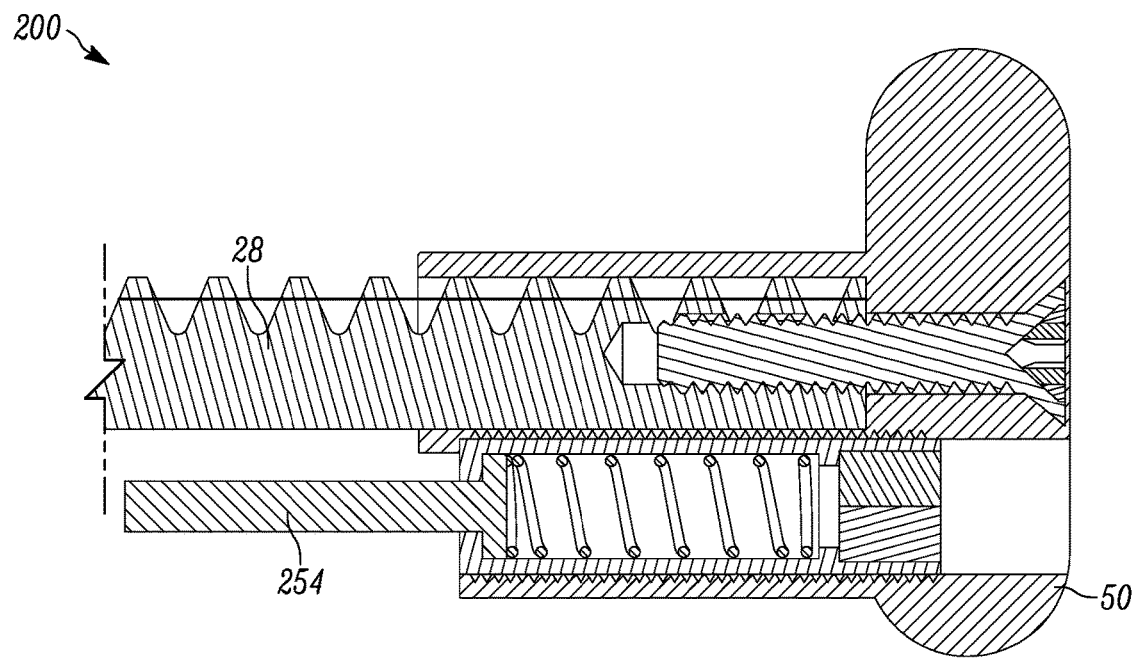
Figure 16B:
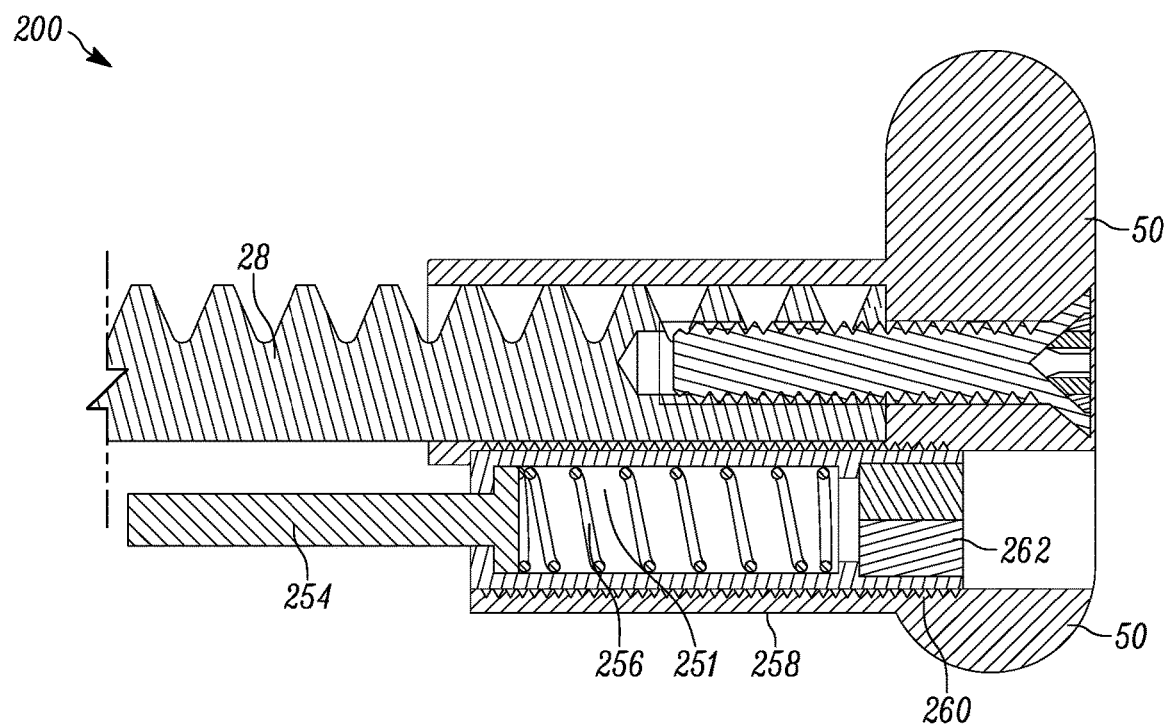
Figure 17A:
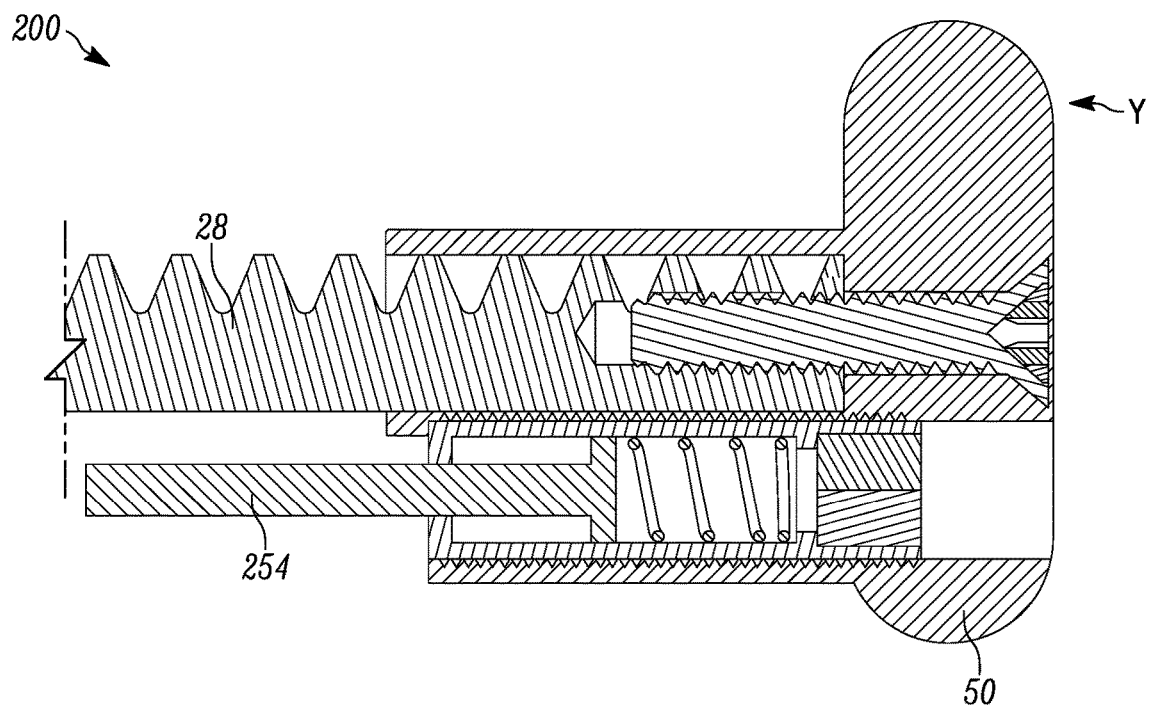
Figure 17B:
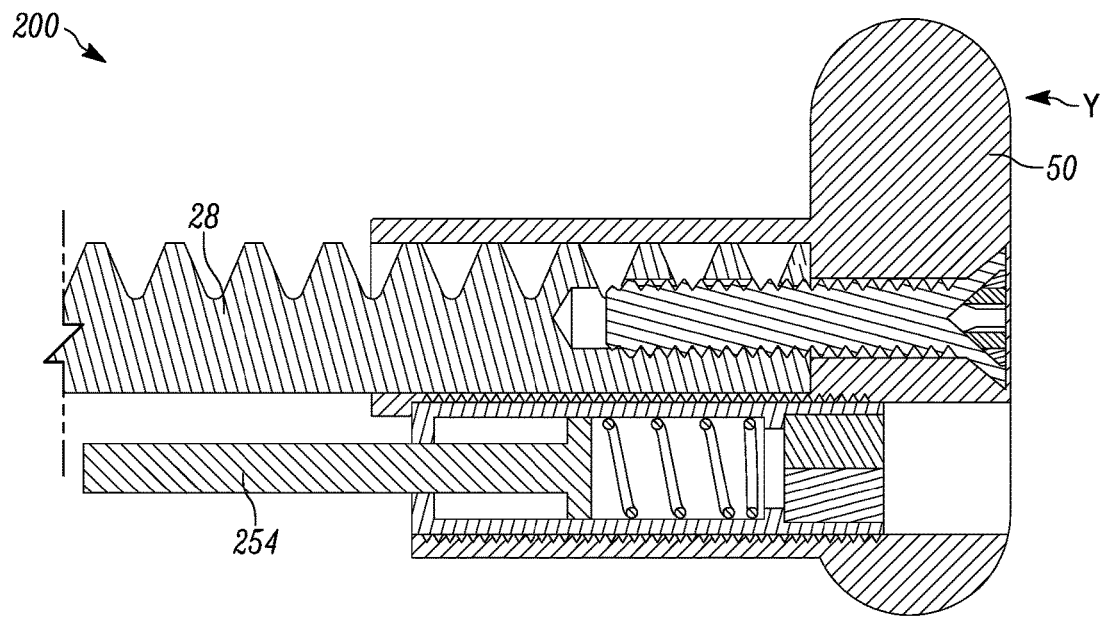
Figure 18A:
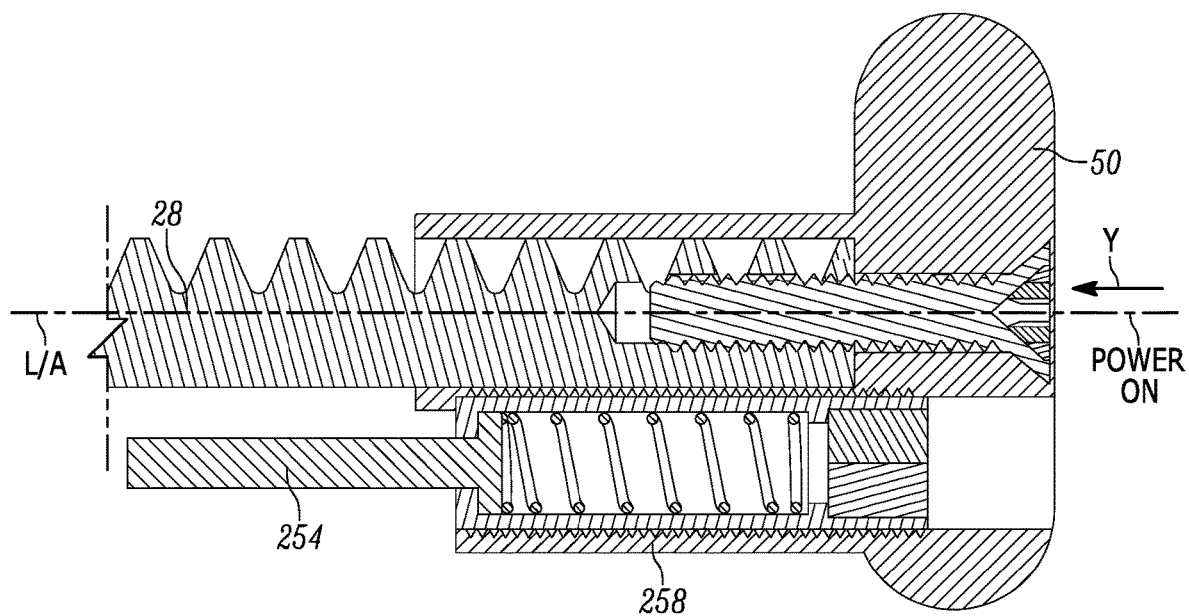
Figure 18B:
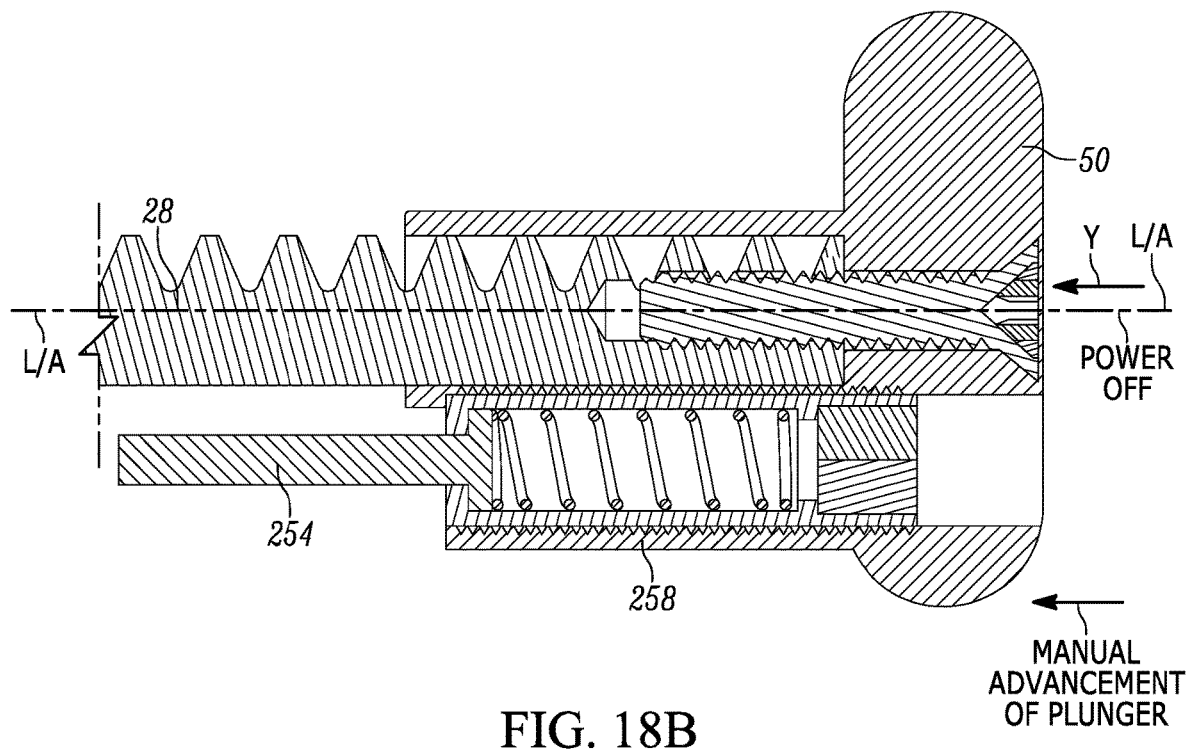

FIGS. 16A and 16B illustrate the normal operating position of the plunger 254 within the body 251 of the control assembly 200. FIGS. 17A and 17B illustrate the actuated position when the tool 10 is electrically off with the maximum mechanical position (manually advancing the rack 28) is achieved. FIG. 18 illustrates the depth adjustment, by adjusting the threaded body 258 within the handle 50, and earlier electrical shut off will occur as the plunger 254 removes the lever arm 64 from the limit switch 62 as illustrated and described above.

Figure 19:
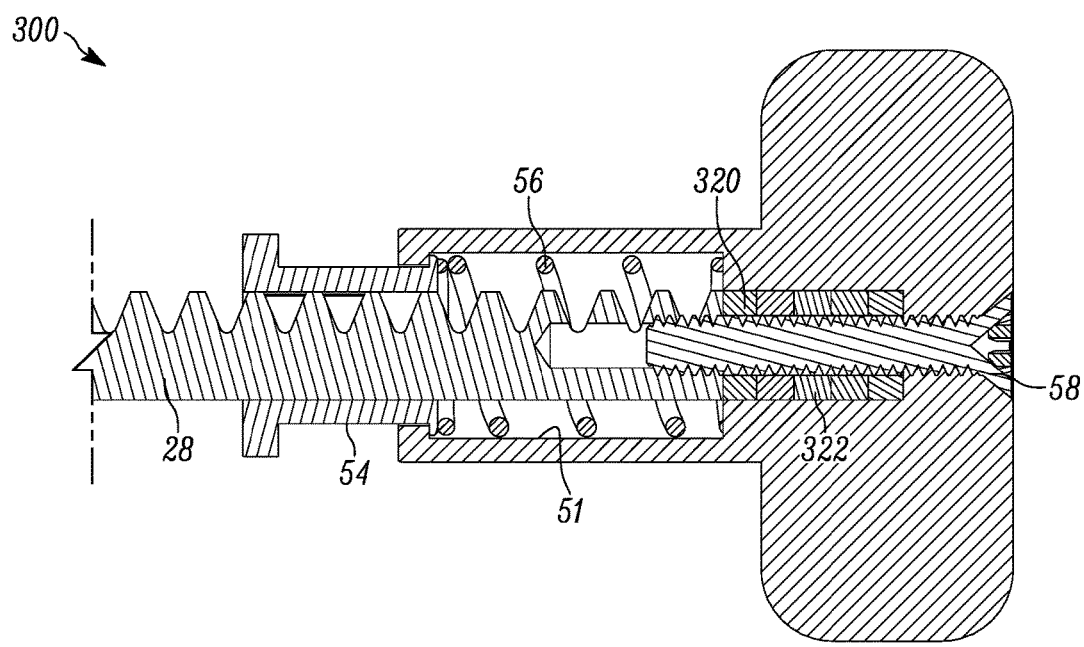
Figure 20A:
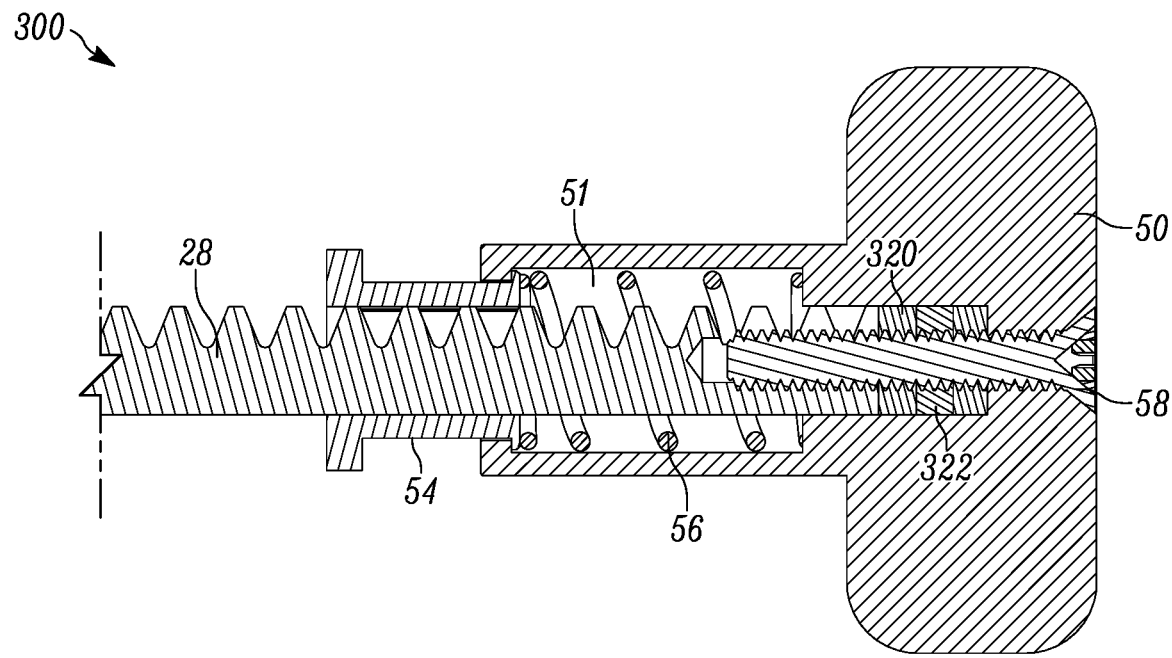
Figure 20B:
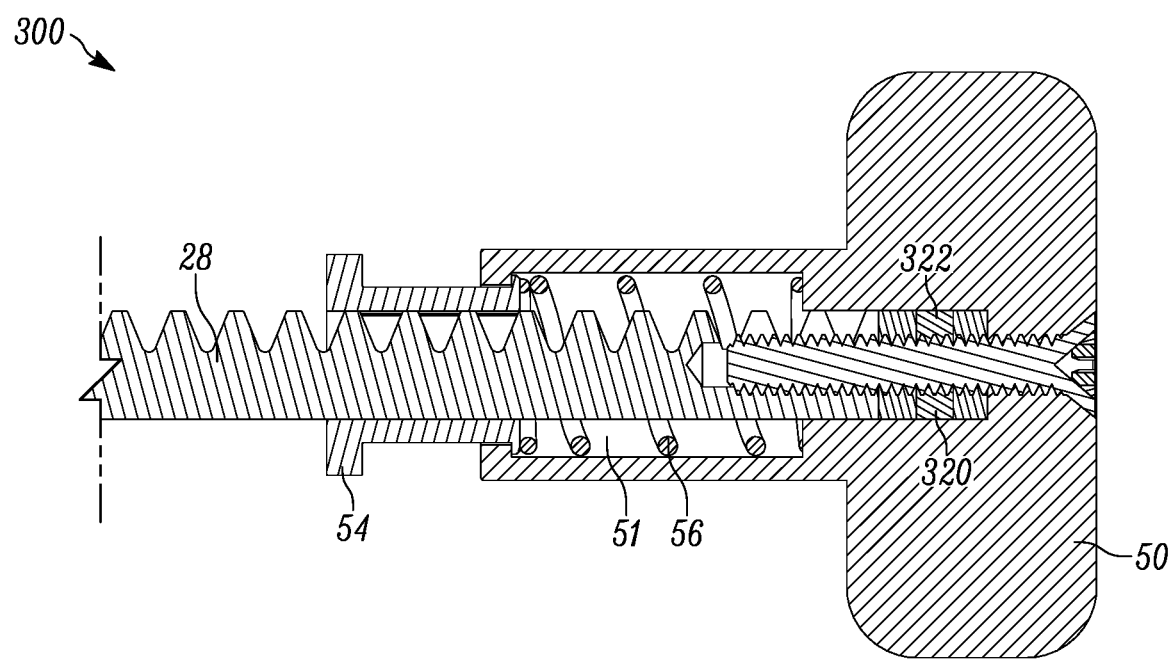
Figure 21A:
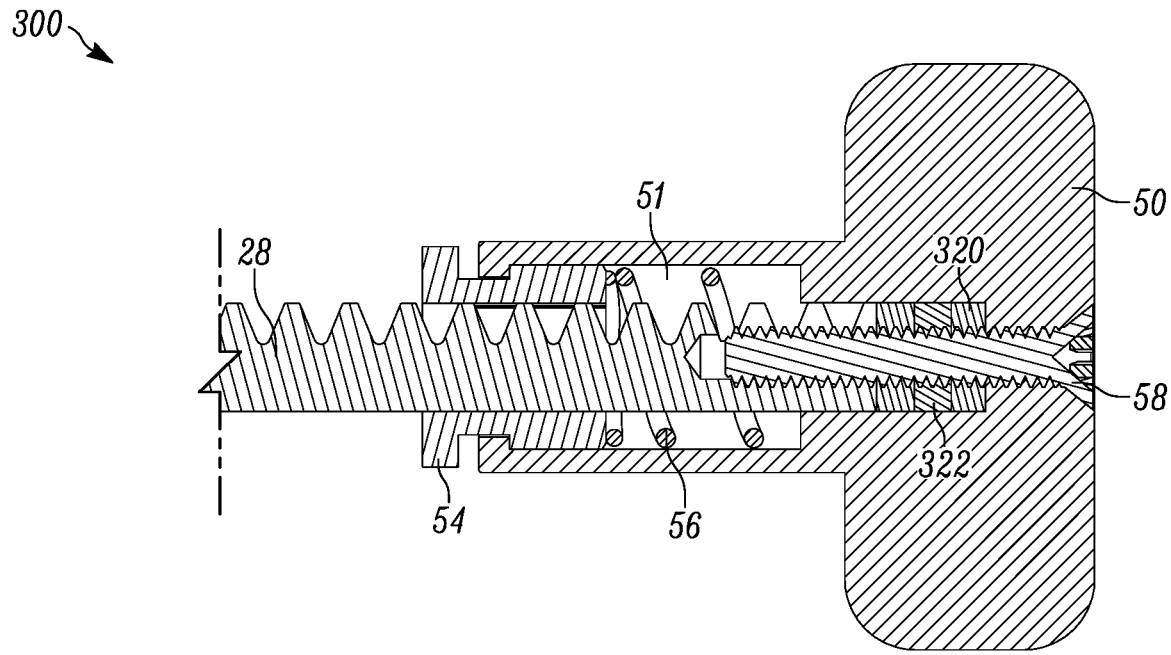
Figure 21B:
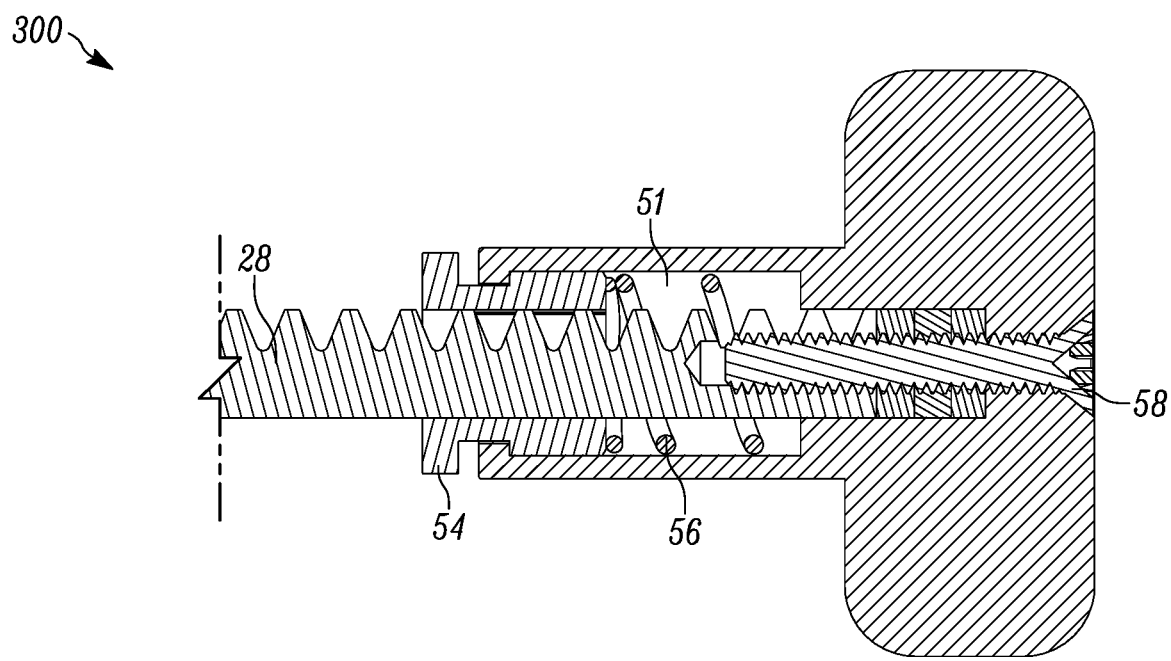
Figure 22A:
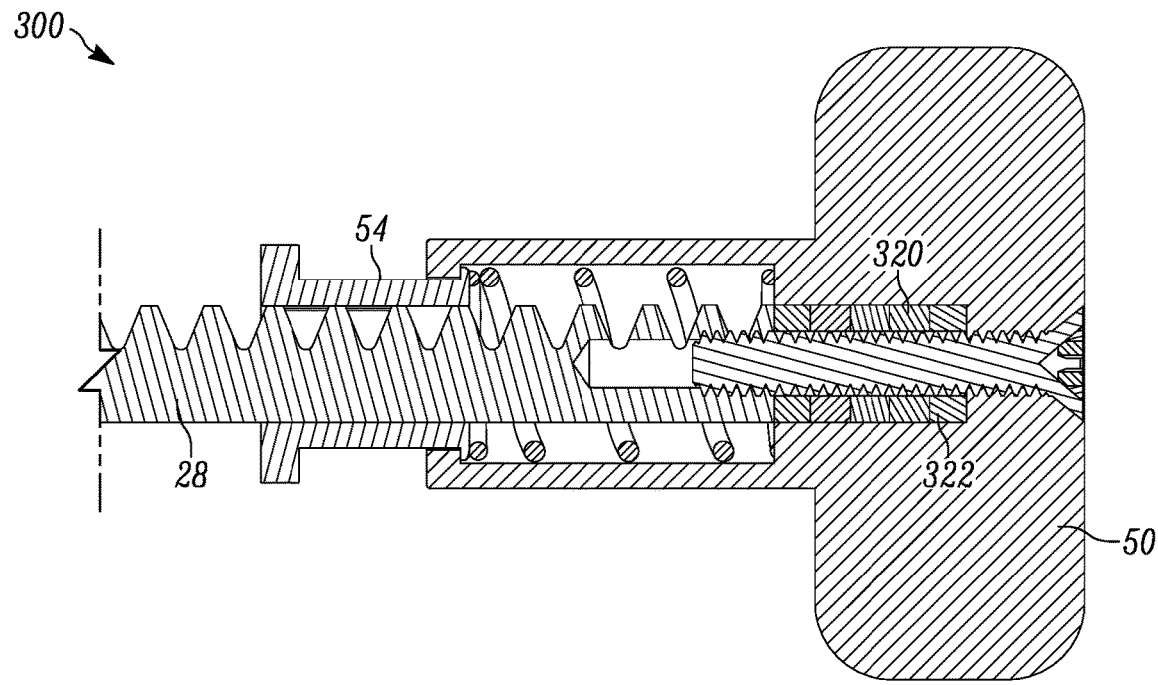
Figure 22B:
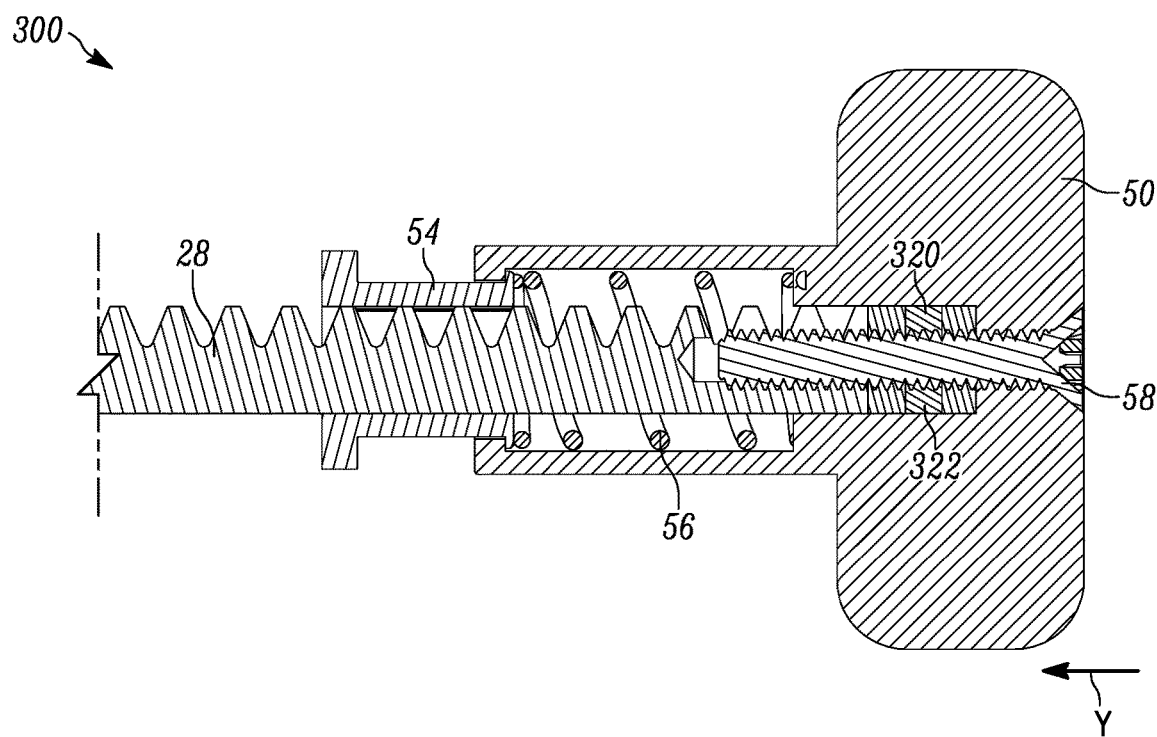
Figure 23A:
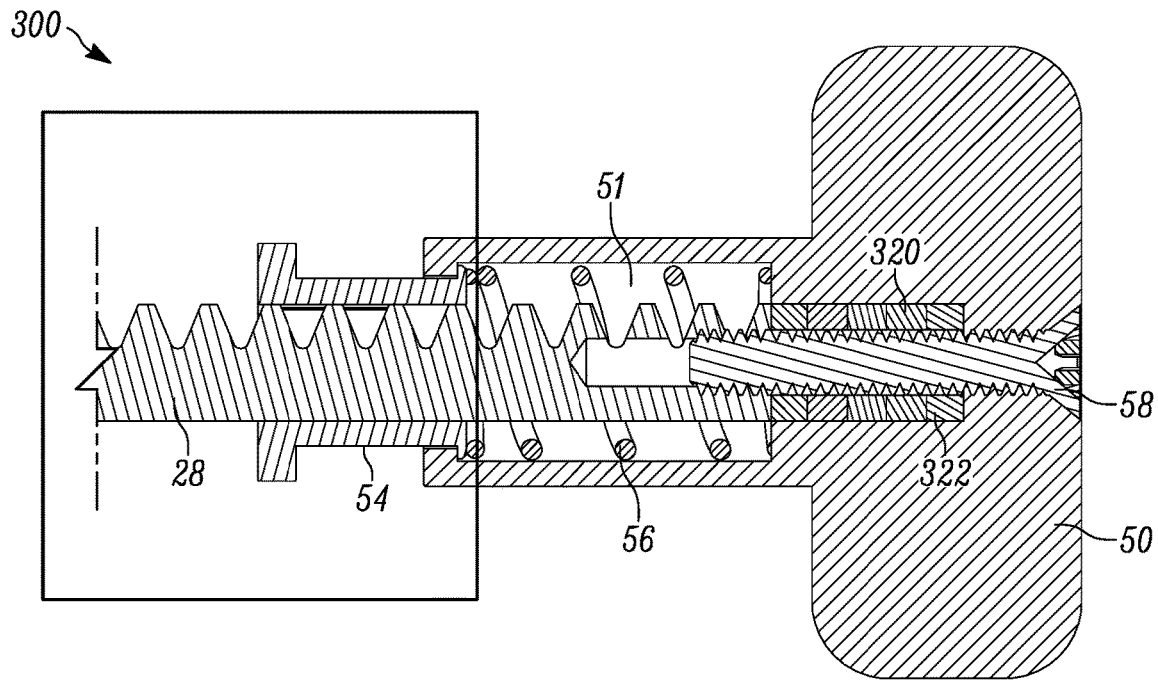
Figure 23B:
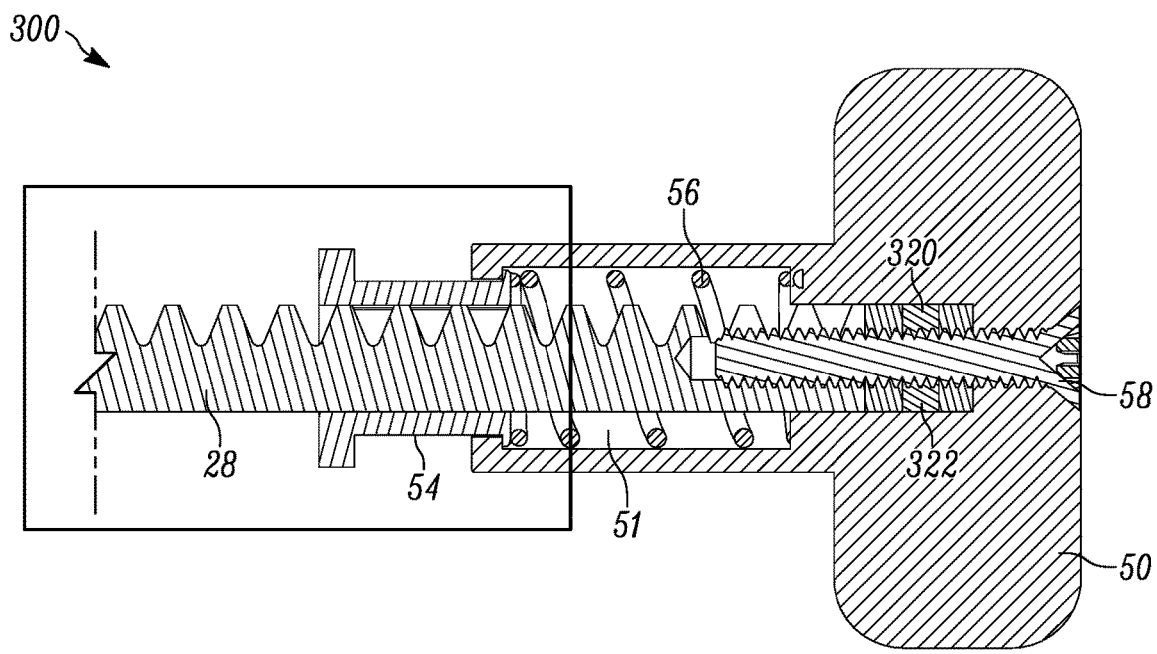

FIG. 19 illustrates a control assembly 300 constructed in accordance with another example embodiment of the present disclosure. The control assembly 300 operates in the same fashion as the embodiment of FIG. 7 with the addition of a secondary bore 320 that houses adjustment spacers 322 within the handle 50. The spacers 322 allow for interval changes of stopping position. FIGS. 20A and 20B illustrate the normal operating position of the plunger 54 within the handle bore 51 of the control assembly 300. FIGS. 21A and 21B illustrate the actuated position when the tool 10 is electrically off with the maximum mechanical position (manually advancing the rack 28) is achieved. FIGS. 22 and 23A-23B illustrate the depth adjustment of both the rack 28 and plunger 54 of the control assembly 300. By reducing the number of spacers 322 in the handle 50, an earlier shutoff position will be achieved. Alternatively, by increasing the number of spacers 322 within the secondary bore 320 of the handle 50, a delayed or later shutoff position be achieved as the rack 28, handle 50, and control assembly are advanced through the housing 13 of the tool by the motor 68. The use of spacers gives the ability to make specialized spacers that correspond with certain differing barrel ends. Such an example embodiment is less prone to unintended depth changes desired by the operator.

Figure 24:
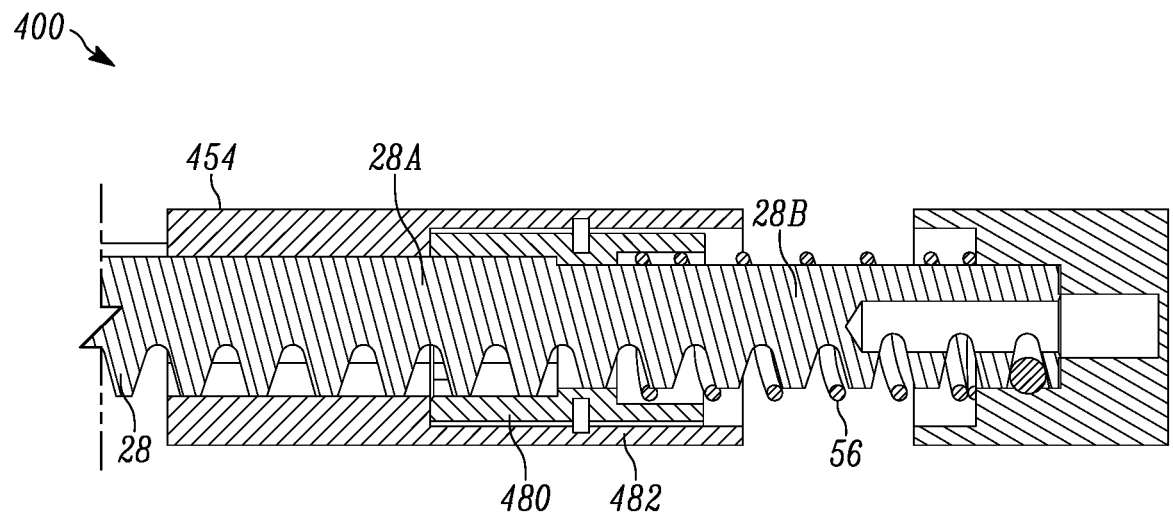
FIGS. 24-28B are section views of a rack control arrangement in accordance with several embodiments of the present disclosure.
Figure 25A:
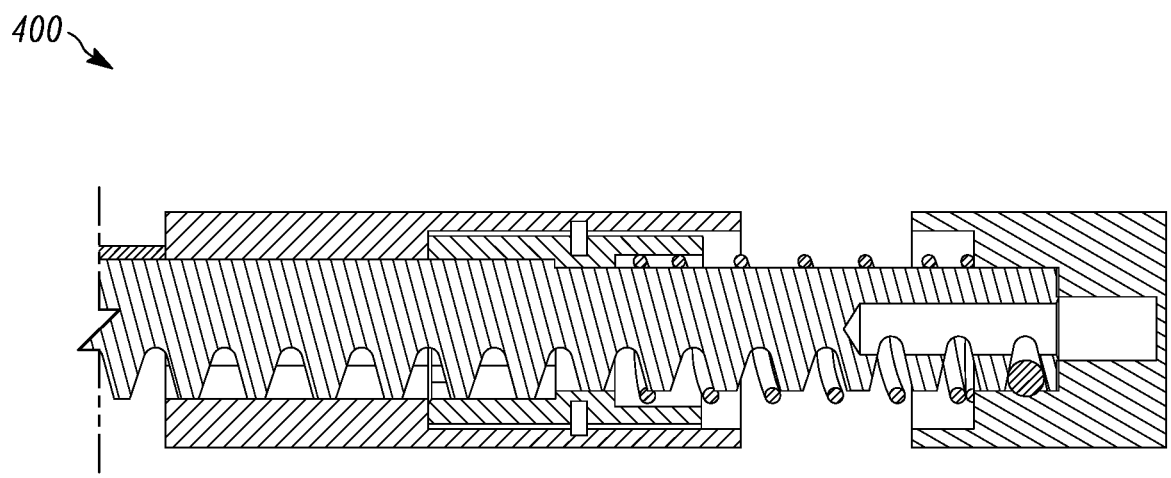
Figure 25B:
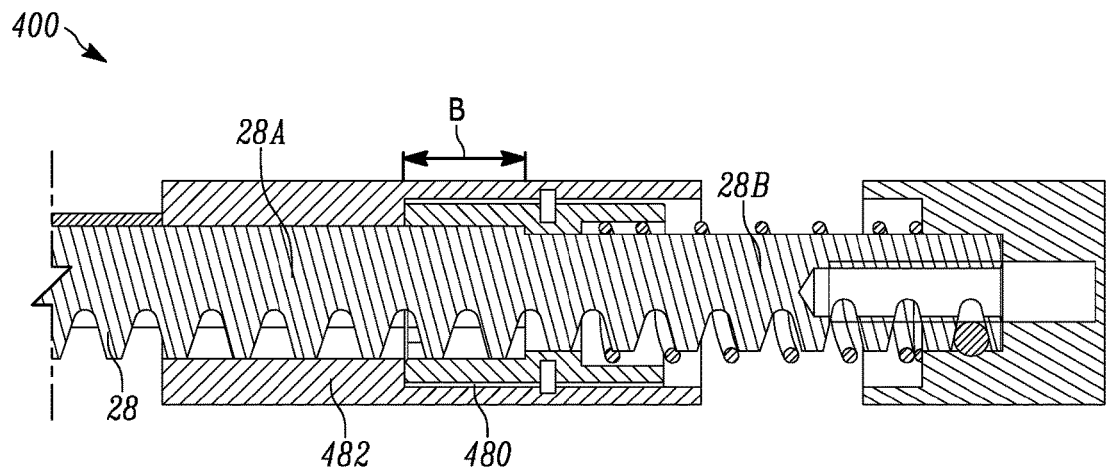
Figure 26A:
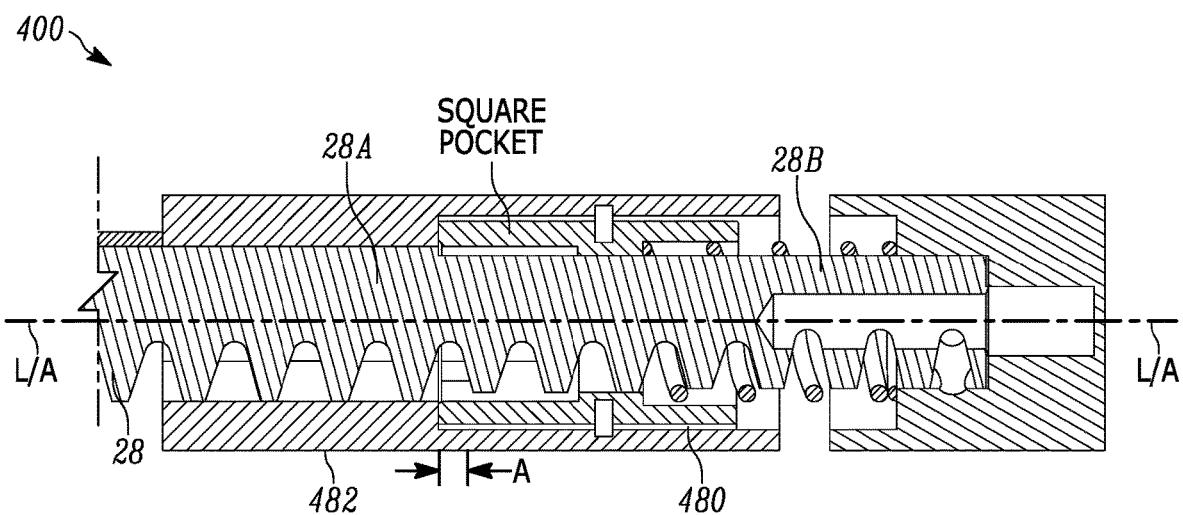
Figure 26B:
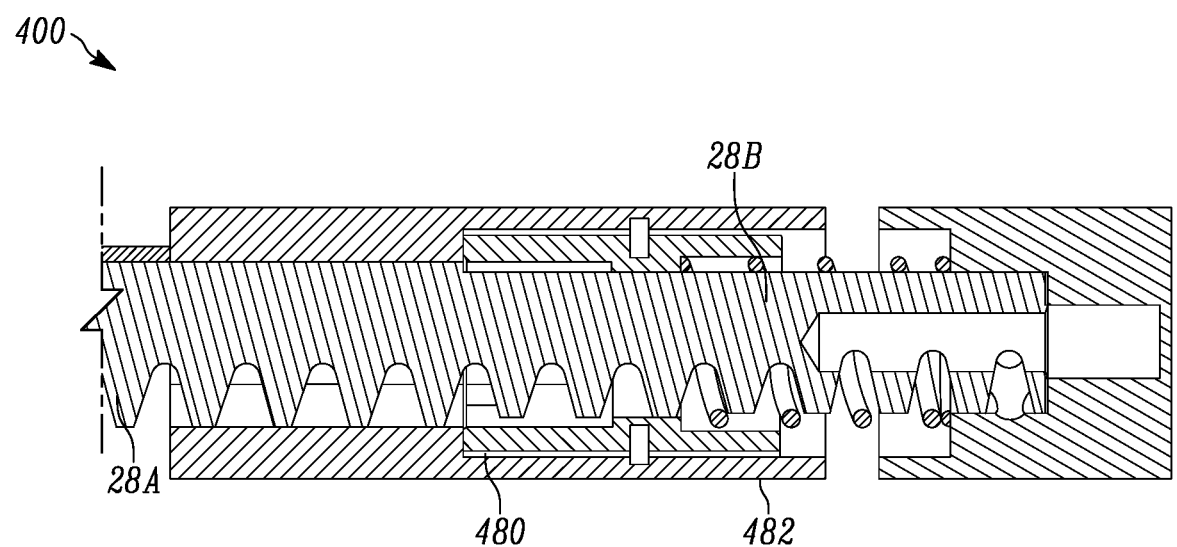
Figure 26C:
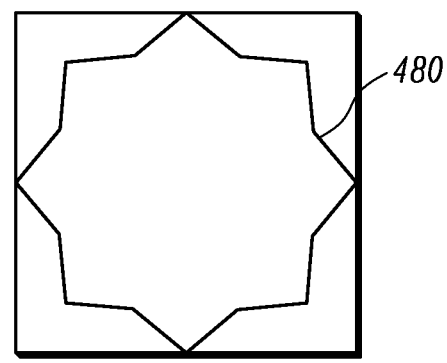
Figure 27A:
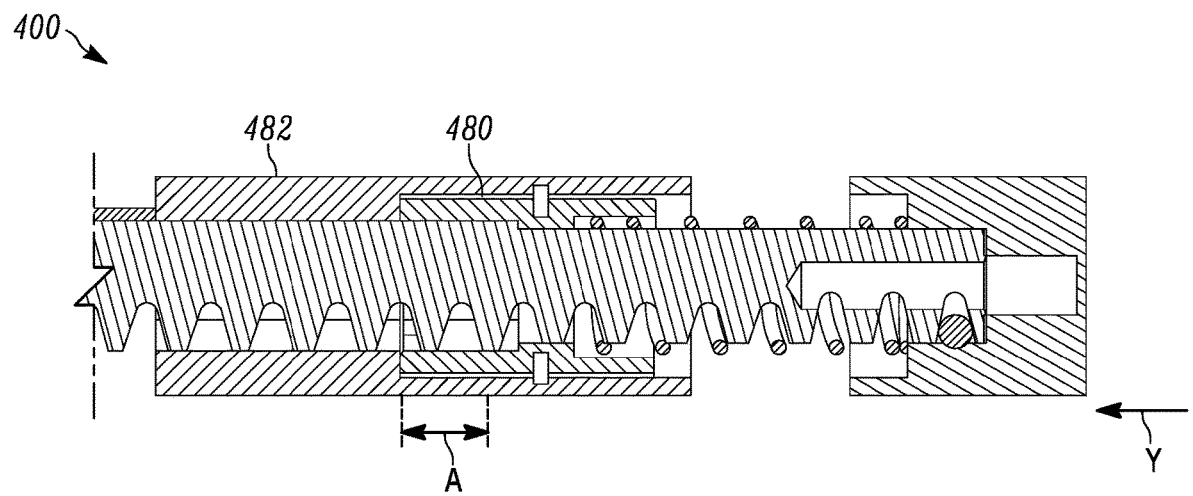
Figure 27B:
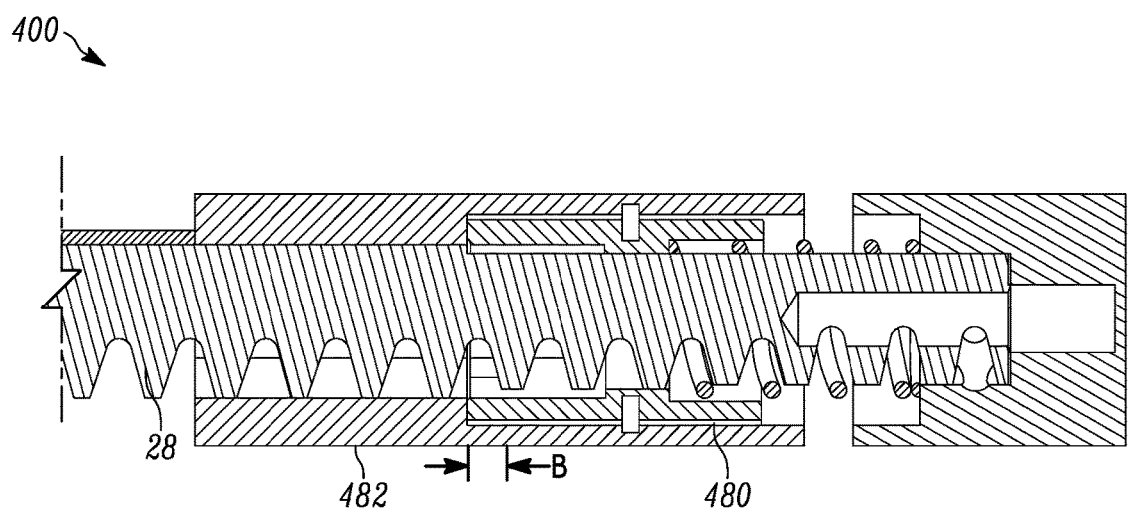
Figure 28A:
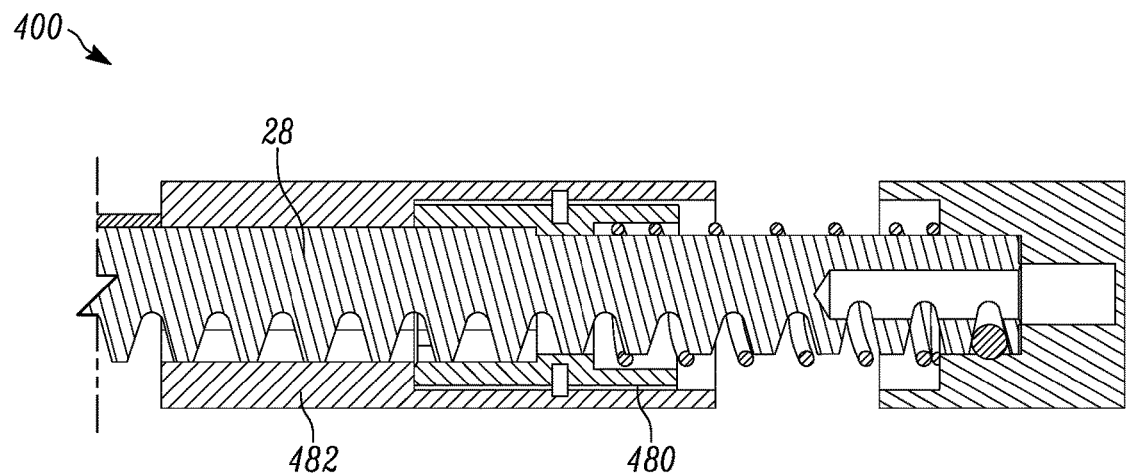
Figure 28B:
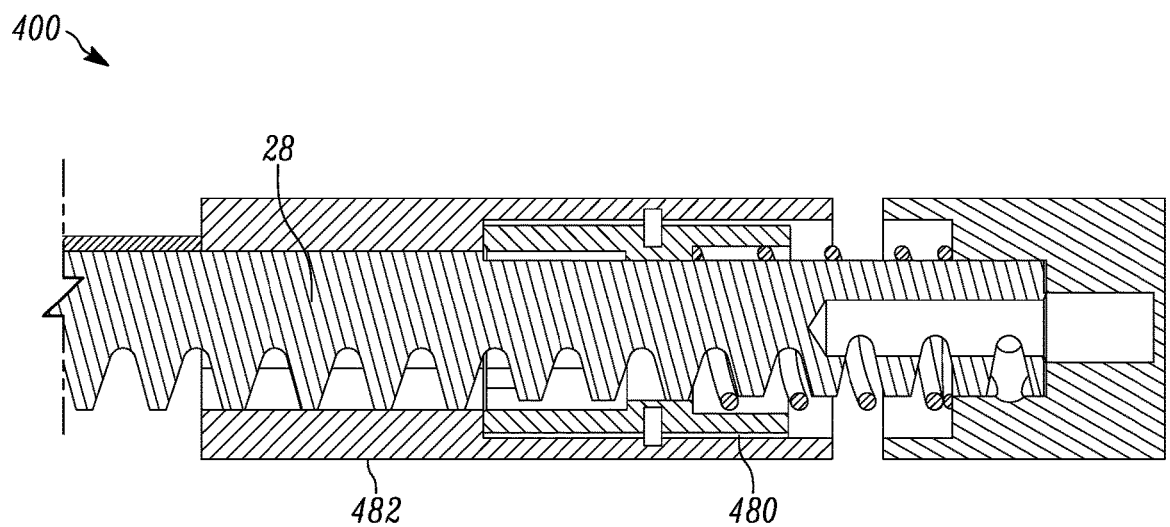

FIG. 24 illustrates a control assembly 400 constructed in accordance with another example embodiment of the present disclosure. The control assembly 400 includes a rack having two different sizes 28A and 28B that set different depths of plunger 454 via a depth selector 480 retained in a bore 482 of the plunger 454 that surrounds the rack 28. The plunger 454 when advanced with the rack 28 makes contact with the switch 62, causing the motor to stop. The spring 56 maintains force to actuate the limit switch while also allowing the manually forced rack 28 to travel past the limit switch stopping in the direction of Arrow Y. The depth selector 480 is a piece of square channel cut at different depths 45 degrees apart from each other when engaged with the rack to provide different stopping points, see for example FIG. 26C. FIGS. 25A and 25B illustrate the normal operating position of the plunger 454 within the handle bore 451 of the plunger of the control assembly 400. FIGS. 26A and 26B illustrate the actuated position when the tool 10 is electrically off with the maximum mechanical position (manually advancing the rack 28) is achieved. FIGS. 27 and 28A-28B illustrate the depth adjustment of both the rack 28 and plunger 454 of the control assembly 400. By changing the depth selection 480, i.e. indexing the depth selector by 45 degrees, the depth of the rack and plunger are changed, as illustrated in FIG. 27. In FIG. 28A the plunger 454 engages the depth selector at a first position and an earlier shutoff position is achieved by the plunger. In FIG. 28B, the depth selector 480 is removed and rotated 45 degrees, and reinserted into the plunger in which a later shutoff position is achieved by the plunger. The depth selector 480 is broached, 3D-printed, EDM, molded, or any other approach to get a square or desired geometry into two different square depth configurations as indicated by the sectional views and the elevated plan view of FIG. 26C. In one example embodiment, the plungers, handles, lever arms, and depth selector are made from polymers, such as plastic. While it should be appreciated that other materials of similar strength and/or weight are contemplated to be within the scope of the present disclosure.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected or in contact, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium, having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A control assembly for a material dispenser comprising:
a plunger movably located within a bore of the control assembly, the plunger having first and second ends, the first end having an abutment for moveably retaining the plunger within the bore and the second end for engaging a switch during operation of the material dispenser to cease operation; and
a spring located within said bore, the spring engaging the first end of said plunger, the spring allowing for the manual movement of the plunger after electrical shutoff without harm to the switch of the material dispenser during use.

2. The control assembly of claim 1 wherein said switch comprises a limit switch that enables and disables a motor that drives a rod coupled to a piston, the piston dispensing material from the material dispenser during operation.

3. The control assembly of claim 2 wherein said plunger is eccentrically spaced from and extends parallel to said rod.

4. The control assembly of claim 2 wherein said rod resides within a secondary bore and said assembly further comprises an adjustment member controlling the amount of travel of said plunger during operation of said material dispenser.

5. The control assembly of claim 2 wherein said motor is coupled to said rod by a gear train.

6. The control assembly of claim 5 wherein said rod is a geared rack that engages a pinion in said gear train.

7. The control assembly of claim 2 wherein said rod and piston concentrically share a first axis and said plunger and bore concentrically share a second axis, said first axis being eccentrically spaced from said second axis.

8. The control assembly of claim 7 further comprising a handle wherein said handle is attached to said rod with a first adjustment member and said plunger is disposed within said bore by a second adjustment member.

9. The control assembly of claim 2 wherein said bore is disposed within an adjustable body, the adjustable body movable relative to said handle and fixedly positioned along said handle by an adjustment spacer.

10. The control assembly of claim 9 wherein said adjustable body is substantially non-concentrically located within said handle.

11. The control assembly of claim 2 wherein said rod further comprises a handle coupled to a first end of the rod opposite a second end of said rod, said bore being disposed within said handle, allowing the manual advancement of said handle, rod, and piston without harm to said switch.

12. The control assembly of claim 11 further comprising an adjustment member coupled to said rod and handle, the adjustment member controlling the amount of travel provided by said rod and piston.

13. The control assembly claim 12 wherein said handle is substantially non-concentrically located about said rod, said bore is substantially concentrically located about said plunger, and said handle is located about said adjustment member.

14. The control assembly of claim 13 further comprising a secondary bore in said handle for supporting said rod.

15. A control assembly for a material dispenser comprising:
a plunger movably located within a bore of the control assembly, the plunger having first and second ends, the first end having an abutment for moveably retaining the plunger within the bore and the second end for engaging a switch during operation of the material dispenser to cease operation, said switch comprises a limit switch that enables and disables a motor that drives a rod;
a handle coupled to a first end of the rod opposite a second end of said rod, said bore being disposed within said handle, allowing the manual advancement of said handle, and rod without harm to said switch; and
a spring located within said bore, the spring engaging the first end of said plunger, the spring allowing for the manual movement of the plunger after electrical shutoff without harm to the switch of the material dispenser during use.

16. The control assembly of claim 15, wherein said rod extends along a first axis and said plunger and bore concentrically share a second axis, said first axis being eccentrically spaced from said second axis.

17. The control assembly of claim 15, wherein said handle is substantially non-concentrically located about said rod.

18. The control assembly of claim 15, wherein said rod is coupled to a piston, the piston dispensing material from the material dispenser during operation.

19. The control assembly of claim 18, comprises an adjustment member coupled to said handle, the adjustment member controlling the amount of travel provided by said plunger within said bore.

20. A control assembly for a material dispenser comprising:

a plunger movably located within a bore of the control assembly, said bore is disposed within an adjustable body, the adjustable body movable along a handle and fixedly positioned along said handle by an adjustment spacer, the plunger having first and second ends, the first end having an abutment for moveably retaining the plunger within the bore and the second end for engaging a switch during operation of the material dispenser to cease operation, said switch comprises a limit switch that enables and disables a motor that drives the rod coupled to a piston wherein said adjustable body is substantially non-concentrically located within said handle; and a spring located within said bore, the spring engaging the first end of said plunger, the spring allowing for the manual movement of the plunger after electrical shutoff without harm to the switch of the material dispenser during use.

* * * * *